(12) United States Patent
Ireland et al.

(10) Patent No.: US 11,879,357 B2
(45) Date of Patent: Jan. 23, 2024

(54) TURBINE BLADE FOR A GAS TURBINE ENGINE

(71) Applicant: ROLLS-ROYCE plc, London (GB)

(72) Inventors: Peter T. Ireland, Oxford (GB); John Coull, Cambridge (GB); João António Coelho Vieira, Oxford (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/067,961

(22) Filed: Dec. 19, 2022

(65) Prior Publication Data

US 2023/0296025 A1 Sep. 21, 2023

(30) Foreign Application Priority Data

Dec. 23, 2021 (GB) ..................................... 2118926

(51) Int. Cl.
*F01D 5/18* (2006.01)
*F01D 25/12* (2006.01)

(52) U.S. Cl.
CPC ............. *F01D 5/186* (2013.01); *F01D 25/12* (2013.01); *F05D 2220/32* (2013.01); *F05D 2240/30* (2013.01); *F05D 2240/304* (2013.01); *F05D 2240/307* (2013.01); *F05D 2260/202* (2013.01)

(58) Field of Classification Search
CPC ............................ F01D 5/186; F05D 2260/202
See application file for complete search history.

(56) References Cited

U.S. PATENT DOCUMENTS

| 6,616,406 | B2* | 9/2003 | Liang | F01D 5/187 416/97 R |
| 8,079,813 | B2* | 12/2011 | Liang | F01D 5/187 416/97 R |
| 2002/0187043 | A1* | 12/2002 | Liang | F01D 5/187 416/97 R |
| 2010/0183429 | A1 | 7/2010 | Liang | |

OTHER PUBLICATIONS

Great Britain search report dated May 30, 2022, issued in GB Patent Application No. 2118926.1.
European search report dated Mar. 21, 2023, issued in European Patent Application No. 2209035.

* cited by examiner

*Primary Examiner* — Eldon T Brockman

(57) ABSTRACT

A turbine blade includes an aerofoil including a leading edge, a trailing edge, a first sidewall, a second sidewall, and an internal cooling circuit disposed within the aerofoil and configured to direct a cooling fluid within the aerofoil. The turbine blade includes at least one first recessed portion formed on the first sidewall proximal to a tip of the turbine blade. The first recessed portion is disposed proximal to and spaced apart from the trailing edge of the aerofoil. The first recessed portion includes a base surface, a first surface, and a second surface. The first recessed portion further includes at least one slot extending from the first surface to the internal cooling circuit. The slot is configured to allow a flow of the cooling fluid from the internal cooling circuit to the first recessed portion.

20 Claims, 17 Drawing Sheets

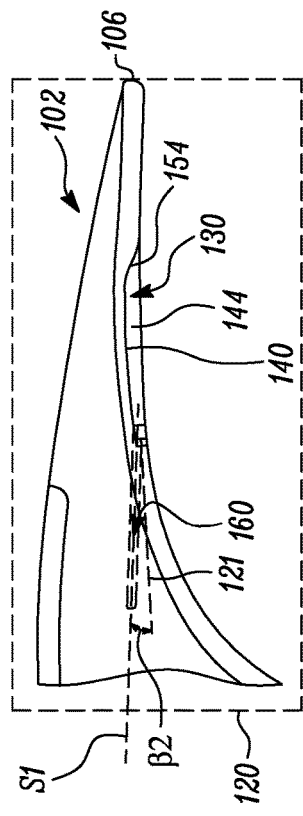
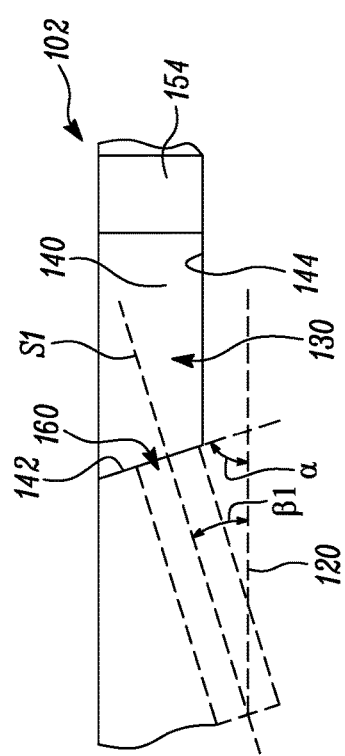
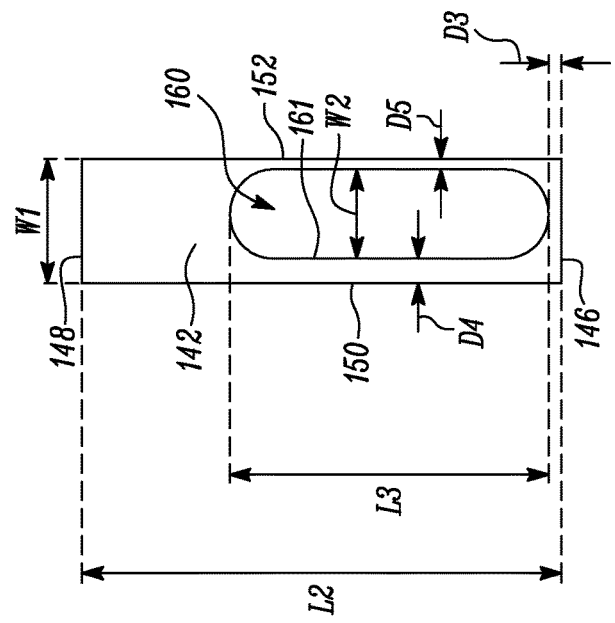
FIG. 4A
FIG. 4B
FIG. 4C

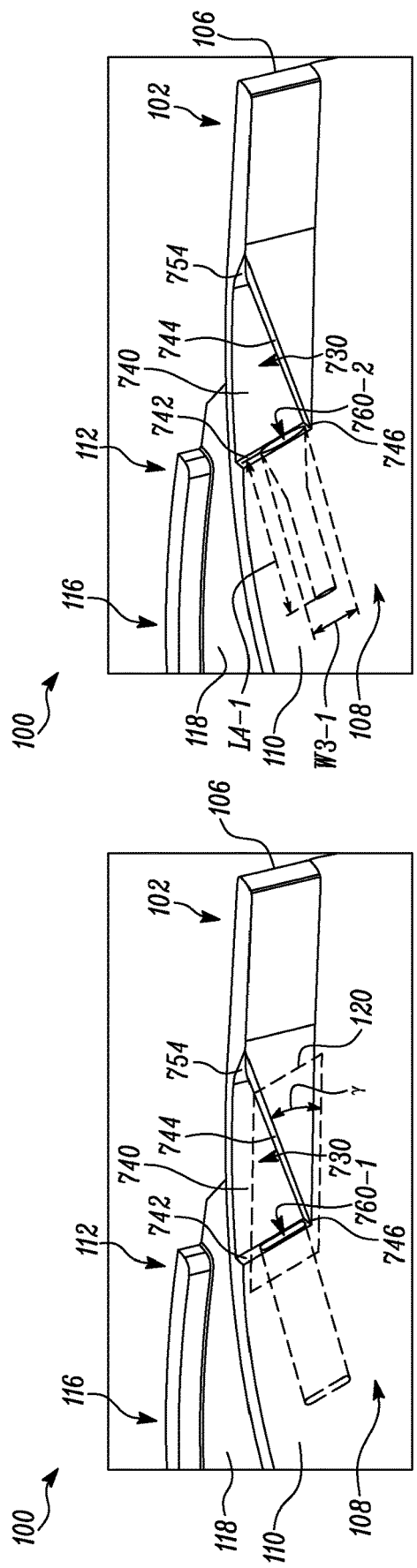

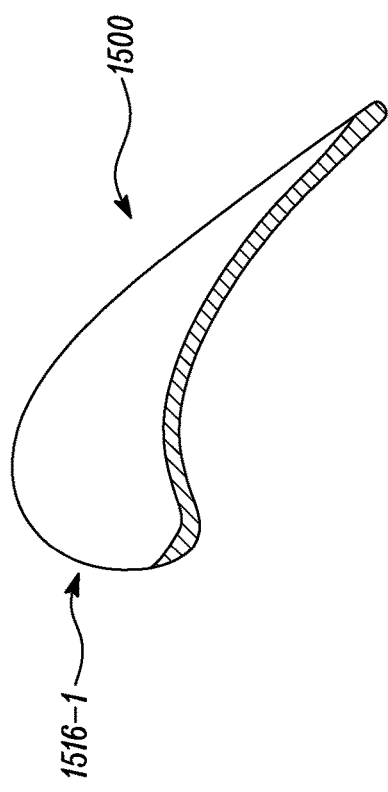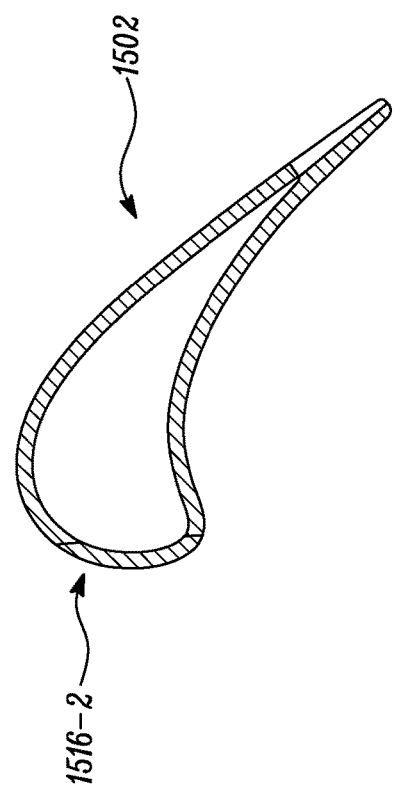

TURBINE BLADE FOR A GAS TURBINE ENGINE

CROSS-REFERENCE TO RELATED APPLICATIONS

This specification is based upon and claims the benefit of priority from United Kingdom patent application number GB 2118926.1 filed on Dec. 23, 2021, the entire contents of which is incorporated herein by reference.

BACKGROUND

Technical Field

The present disclosure generally relates to gas turbine engines, and in particular, to a turbine blade for a gas turbine engine.

Description of the Related Prior Art

A turbine, such as, a high-pressure turbine, an intermediate pressure turbine, or a low-pressure turbine, associated with a gas turbine engine generally includes a rotor having multiple turbine blades. The turbine also includes a stator including multiple guide vanes. Hot gases flowing along a rotational axis of the gas turbine engine from the guide vanes towards the turbine blades cause the turbine blades to rotate about the rotational axis. Typically, the hot gases flow from a leading edge of the turbine blade towards a trailing edge of the turbine blade.

Due to interaction of the turbine blades with the hot gases, heat zones may be formed on an aerofoil of the turbine blade. Such heat zones may be prominent at locations that are proximate to a tip of the turbine blade and a trailing edge of the turbine blade. Excessive heating of the turbine blades may decrease an efficiency of the turbine and may cause degradation of the turbine blades. Accordingly, a cooling technique may be required to maintain a temperature of the turbine blades within desired temperature levels. Some turbine blades include cooling holes that may be defined proximate to the tip of turbine blade and/or proximate to the trailing edge of the turbine blade. Such cooling holes may be in fluid communication with internal passages defined within the aerofoil. The cooling holes may receive a cooling fluid, such as, air from the internal passages. The cooling fluid exiting the cooling holes may lower a temperature of the turbine blades.

However, such cooling holes may not provide efficient cooling of the turbine blades. In particular, the cooling holes may not provide sufficient and/or effective coverage of the cooling fluid on one or more portions of the turbine blade, such as, the tip of the turbine blade or the trailing edge of the turbine blade. Moreover, a design and location of the cooling holes, or other similar features, provided for cooling of the turbine blades, may have an undesirable impact on an aerodynamic performance of the turbine blade.

SUMMARY

In a first aspect, there is provided a turbine blade for a gas turbine engine. The turbine blade includes an aerofoil including a leading edge, a trailing edge, a first sidewall defining a pressure surface, and a second sidewall defining a suction surface. The first sidewall and the second sidewall are connected to each other at each of the trailing edge and the leading edge. The turbine blade further includes an internal cooling circuit disposed within the aerofoil and configured to direct a cooling fluid within the aerofoil. The turbine blade further includes a tip including a tip base disposed on the aerofoil. The tip base extends between the first sidewall and the second sidewall and between the leading edge and the trailing edge. The tip base defines a tip plane. The aerofoil defines a chordal length between the leading edge and the trailing edge at the tip. The turbine blade further includes at least one first recessed portion formed on the first sidewall proximal to the tip and recessed inboard from the pressure surface. The at least one first recessed portion is disposed proximal to and spaced apart from the trailing edge of the aerofoil. The at least one first recessed portion includes a base surface disposed inboard from the pressure surface. The at least one first recessed portion further includes a first surface extending from the base surface to the pressure surface. The first surface further extends at least radially towards the tip. The first surface is inclined obliquely to the tip plane by a first angle. The at least one first recessed portion further includes a second surface extending from the base surface to the pressure surface. The second surface further extends from the first surface distal to the tip towards the trailing edge. The second surface is inclined relative to the first surface. The turbine blade further includes at least one slot extending from the first surface of the at least one first recessed portion to the internal cooling circuit such that the at least one slot fluidly communicates the at least one first recessed portion with the internal cooling circuit. The at least one slot is configured to allow a flow of the cooling fluid from the internal cooling circuit to the at least one first recessed portion.

The first recessed portion associated with the turbine blade described herein may be embodied as a pocket on the turbine blade that may hold at least a portion of the cooling fluid therein. Further, the first recessed portion may allow efficient cooling of the turbine blade. For example, the cooling fluid exiting the slot of the first recessed portion may promote cooling of the trailing edge of the turbine blade and portions of the tip of the turbine blade. The first recessed portion may also allow improved coverage of the cooling fluid on various surfaces of the turbine blade. Moreover, the first recessed portion may be designed such that the first recessed portion may have no undesirable impact on an aerodynamic performance of the turbine blade.

In some embodiments, the first surface extends from a radially inner edge connected to the second surface to a radially outer edge proximal to the tip. The at least one slot is disposed proximal to the radially inner edge of the first surface. Such a slot disposed proximate to the radially inner edge of the first surface may allow efficient filling of the first recessed portion with the cooling fluid and may also allow improved flow of the cooling fluid towards relatively hotter portions of the turbine blade, such as, the tip of the turbine blade.

In some embodiments, a minimum distance between the radially inner edge of the first surface and the trailing edge of the aerofoil is at most 90% of the chordal length. The first recessed portion disposed proximate to the trailing edge may improve the cooling of the trailing edge.

In some embodiments, a length of the first surface between the radially inner edge and the radially outer edge is from about 1.5% to about 30% of the chordal length. The first surface having a higher length between the radially inner edge and the radially outer edge may allow provision of multiple slots, which may in turn improve the cooling of the turbine blade that includes only one first recessed portion.

In some embodiments, the at least one slot includes a slot opening disposed on the first surface and fluidly communicating with the at least one first recessed portion. A minimum distance between the slot opening and the radially inner edge is at most 10% of the length of the first surface between the radially inner edge and the radially outer edge.

In some embodiments, a maximum length of the slot opening between the radially inner edge and the radially outer edge of the first surface is from about 0.4% to about 15% of the chordal length.

In some embodiments, the maximum length of the slot opening is greater than a maximum width of the slot opening perpendicular to the maximum length by a factor of at least two.

In some embodiments, the maximum width of the slot opening is from about 0.4% to about 3% of the chordal length.

In some embodiments, the first surface further includes a first longitudinal edge extending from the radially inner edge to the radially outer edge and connected to the pressure surface. The first surface further includes a second longitudinal edge disposed opposite to the first longitudinal edge and extending from the radially inner edge to the radially outer edge. The second longitudinal edge is connected to the base surface. A minimum distance between the slot opening and the first longitudinal edge is greater than a minimum distance between the slot opening and the second longitudinal edge.

In some embodiments, a width of the first surface between the first longitudinal edge and the second longitudinal edge is greater than the minimum distance between the slot opening and the first longitudinal edge by factor of at least three.

In some embodiments, the width of the first surface between the first longitudinal edge and the second longitudinal edge is from 20% to 80% of a thickness of the first sidewall.

In some embodiments, the at least one first recessed portion further includes a third surface extending from the base surface to the pressure surface opposite to the first surface. The third surface extends between an inboard edge connected to the base surface and an outboard edge connected to the pressure surface. A minimum distance between the radially inner edge of the first surface and the outboard edge of the third surface is from about 3% to about 40% of the chordal length of the aerofoil. The third surface may define a gradient that may direct a portion of the cooling fluid exiting the slot towards the trailing edge.

In some embodiments, the at least one first recessed portion further includes a fourth surface extending from the base surface to the pressure surface and connected to the first surface. The fourth surface is disposed opposite to the second surface.

In some embodiments, each of the first surface, the third surface, and the base surface extends from the tip, such that the base surface separates the first surface and the third surface at the tip.

In some embodiments, the first angle is greater than about 45 degrees and less than about 90 degrees.

In some embodiments, the second surface is inclined to the tip plane by a second angle from about 0 degree to about 40 degrees. An inclination of the second surface may direct the cooling fluid towards the tip of the turbine blade, thereby improving cooling of the tip.

In some embodiments, the at least one slot is inclined to the tip plane by a first slot angle from about 0 degree to about 45 degrees. The at least one slot is inclined to a transverse plane of the aerofoil by a second slot angle from about 0 degree to about 25 degrees. The transverse plane is normal to the tip plane and extends from the leading edge to the trailing edge. The first slot angle and the second slot angle may be defined such that the slot may be easy to define from a manufacturing standpoint. Moreover, the first slot angle and the second slot angle may be defined such that the cooling fluid exiting the slot may be directed towards the tip and the trailing edge.

In some embodiments, the at least one slot tapers along at least a portion of its length from the first surface. The tapering slot may increase a flow velocity at which the cooling fluid may exit the slot.

In some embodiments, the at least one first recessed portion extends from or is spaced apart from the tip.

In some embodiments, the at least one slot includes a plurality of slots extending from the first surface. The plurality of slots may provide a larger coverage of the cooling fluid on the surfaces of the turbine blade, thereby improving the cooling of the turbine blade that includes only one first recessed portion.

In some embodiments, the plurality of slots includes rows of slots that are parallel to each other.

In some embodiments, at least one first slot from the plurality of slots defines a first slot axis along its length and at least one second slot from the plurality of slots defines a second slot axis along its length. The first slot axis intersects with the second slot axis.

In some embodiments, the at least one first recessed portion further includes a plurality of first surfaces inclined obliquely to the tip plane and spaced apart from each other, such that one of the plurality of first surfaces is connected to the second surface. The at least one first recessed portion further includes one or more connecting surface portions extending between corresponding adjacent first surfaces from the plurality of first surfaces. Each of the one or more connecting surface portions is inclined to each of the corresponding adjacent first surfaces. Further, at least one slot from the plurality of slots extends from each of the plurality of first surfaces. Such a staggered arrangement of the first surfaces may allow provision of increased number of slots for turbine blades that include only one first recessed portion, thereby improving cooling of the turbine blade.

In some embodiments, the at least one first recessed portion includes a plurality of first recessed portions spaced apart from each other and disposed along the first side wall. Provision of two or more first recessed portions may allow improved coverage of the cooling fluid on the turbine blade, thereby improving cooling of the turbine blade.

In some embodiments, the turbine blade further includes at least one second recessed portion and at least one slot extending from the at least one second recessed portion to the internal cooling circuit such that the at least one slot fluidly communicates the at least one second recessed portion with the internal cooling circuit. The second side wall defines an inner surface opposite to the suction surface. The at least one second recessed portion is disposed on the inner surface of the second side wall. The cooling fluid exiting the slot of the second recessed portion may allow improved cooling of the inner surface of the second sidewall.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIG. 4A is a schematic side view of the first recessed portion of FIG. 3;

FIG. 4B is a schematic top view of the first recessed portion of FIG. 3;

FIG. 4C is a schematic view of a first surface defined by the first recessed portion of FIG. 3;

FIG. 7A is a schematic perspective view of a first recessed portion associated with the turbine blade of FIG. 3;

FIG. 7B is a schematic perspective view of a first recessed portion associated with the turbine blade of FIG. 3;

FIG. 15A illustrates a schematic sectional view of different designs of turbine blades.

FIG. 15B illustrates a schematic sectional view of different designs of turbine blades.

DETAILED DESCRIPTION

Figure 1:
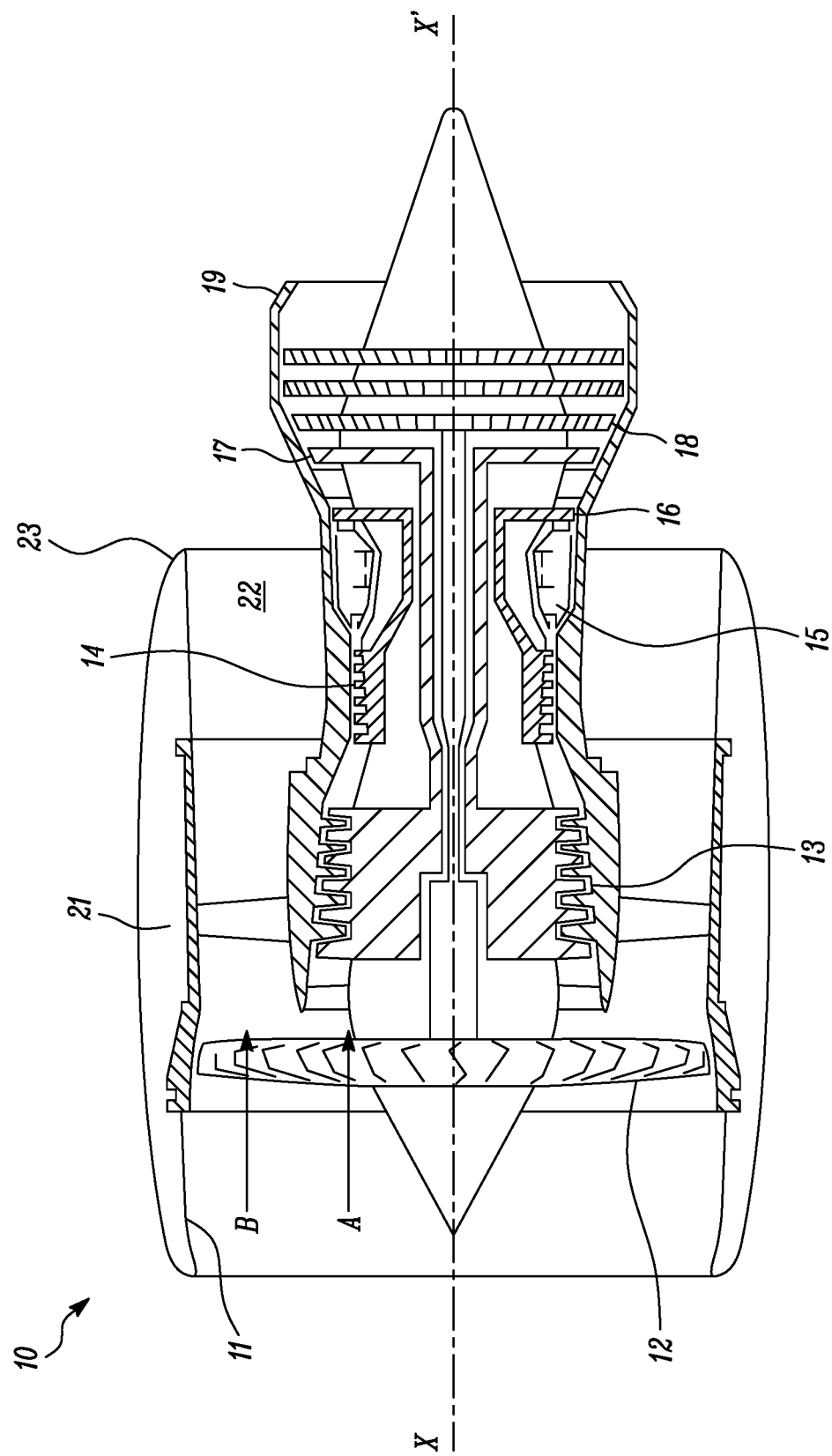
FIG. 1 is a schematic sectional view of a gas turbine engine, according to an embodiment of the present disclosure.

FIG. 1 shows a schematic sectional view of a gas turbine engine 10 for an aircraft. The gas turbine engine 10 has a rotational axis X-X'.

In the following disclosure, the following definitions are adopted. The terms "upstream" and "downstream" are considered to be relative to an air flow through the gas turbine engine 10. The terms "axial" and "axially" are considered to relate to the direction of the rotational axis X-X' of the gas turbine engine 10.

The gas turbine engine 10 includes, in axial flow series, an intake 11, a fan 12, an intermediate pressure compressor 13, a high-pressure compressor 14, combustion equipment 15, a high-pressure turbine 16, an intermediate pressure turbine 17, a low-pressure turbine 18, and an engine core exhaust nozzle 19. A nacelle 21 generally surrounds the gas turbine engine 10 and defines the intake 11, a bypass duct 22, and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture is combusted. The resultant hot combustion products then expand through, and thereby drive the high, intermediate, and low-pressure turbines 16, 17, 18 before being exhausted through the engine core exhaust nozzle 19 to provide additional propulsive thrust. The high, intermediate, and low-pressure turbines 16, 17, 18 respectively drive the high and intermediate pressure compressors 14, 13 and the fan 12 by suitable interconnecting shafts.

In some embodiments, the gas turbine engine 10 is used in an aircraft. In some embodiments, the gas turbine engine 10 is an ultra-high bypass ratio (UHBPR) engine.

Figure 2:
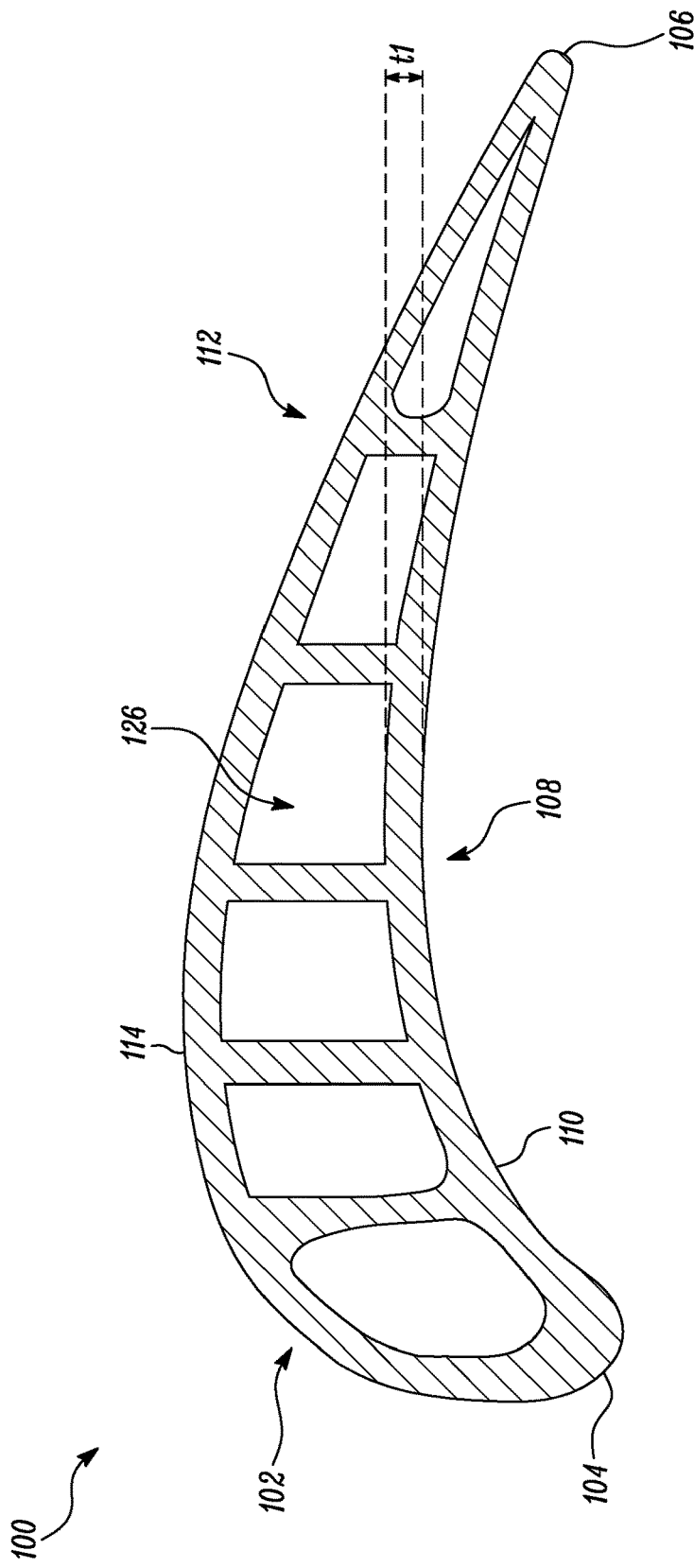
FIG. 2 is a schematic sectional view a turbine blade associated with the gas turbine engine of FIG. 1.

FIG. 2 is a schematic sectional view of a portion of an exemplary turbine blade 100 of the gas turbine engine 10 (see FIG. 1). The turbine blade 100 may be associated with any of the high-pressure, intermediate, and/or low-pressure turbines 16, 17, 18 (see FIG. 1), without any limitations. A radial direction R is defined with respect to the rotational axis X-X' of the gas turbine engine 10. As used herein, terms that refer to a radial direction, such as "radially outer", "radially inner", "radially extending", "radially inwards", "radially outwards", and "radially proximal", are with respect to the radial direction R. Further, a direction Z is also defined with respect to the rotational axis X-X', such that the direction Z is substantially orthogonal to the rotational axis X-X'. As used herein, terms, such as, "inboard" and "outboard" are with respect to the direction Z. For explanatory purposes, only one turbine blade 100 is shown herein. However, it should be noted that the turbines 16, 17, 18 may include multiple turbine blades similar to the turbine blade 100 that may be circumferentially arranged about the rotational axis X-X'.

The turbine blade 100 includes an aerofoil 102. The aerofoil 102 includes a leading edge 104, a trailing edge 106, a first sidewall 108 defining a pressure surface 110, and a second sidewall 112 defining a suction surface 114. The first sidewall 108 and the second sidewall 112 are connected to each other at each of the trailing edge 106 and the leading edge 104. The first sidewall 108 defines a thickness t1.

The turbine blade 100 also includes an internal cooling circuit 126. The internal cooling circuit 126 is disposed within the aerofoil 102 and configured to direct a cooling fluid within the aerofoil 102. The internal cooling circuit 126 may include a number of passages formed within the aerofoil 102 that may allow passage of the cooling fluid therethrough. The cooling fluid may cool various portions of the turbine blade 100 during an operation of the gas turbine engine 10. Further, the cooling fluid may include cooled and compressed air. In some examples, the internal cooling circuit 126 may receive the cooling fluid from the compressor 13, 14 (see FIG. 1) associated with the gas turbine engine 10.

Figure 3:
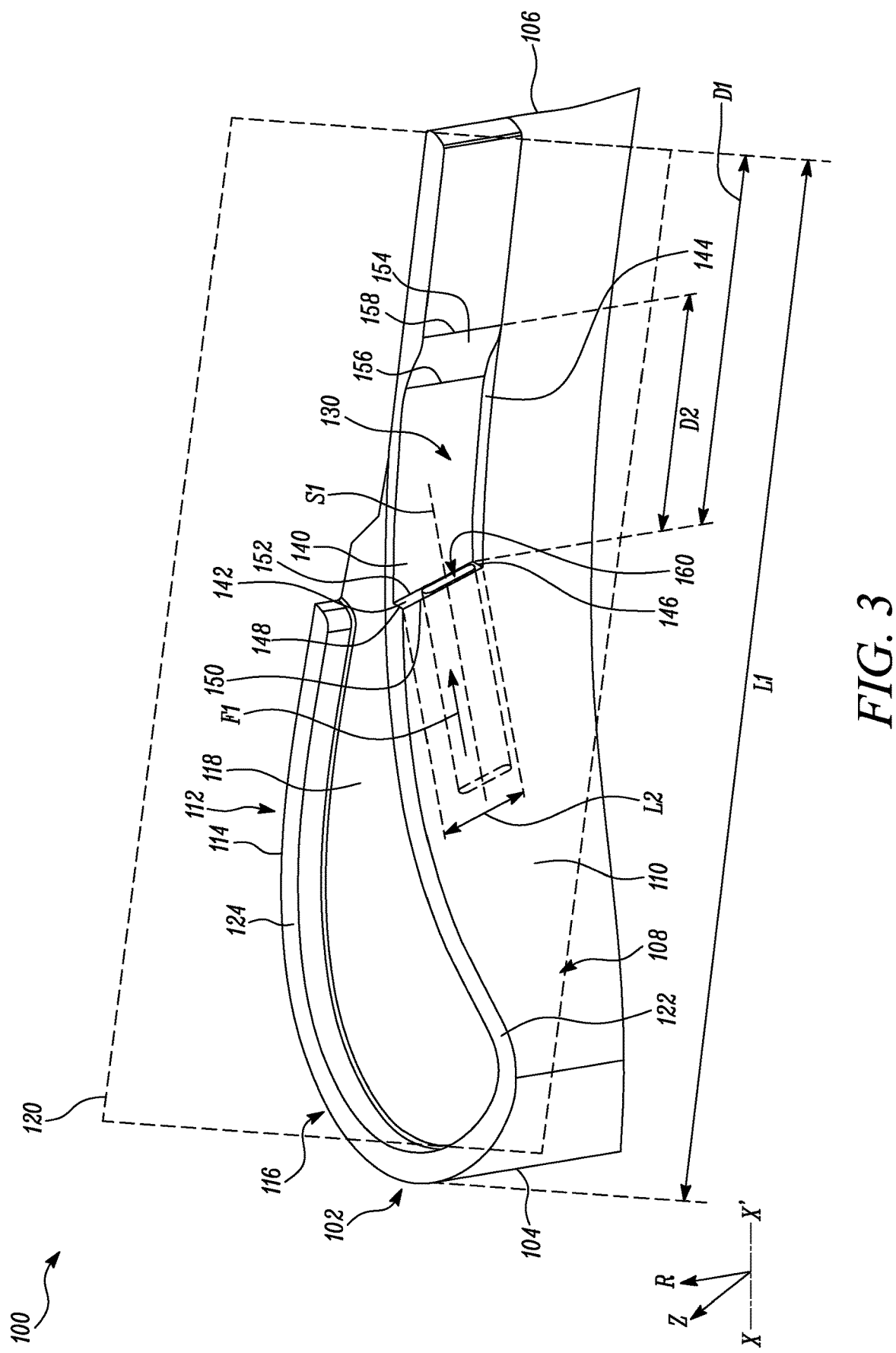
FIG. 3 is a schematic perspective view of the turbine blade having a first recessed portion.

Referring now to FIG. 3, the turbine blade 100 includes a tip 116. The tip 116 includes a tip base 118 disposed on the aerofoil 102. The tip base 118 may be generally planar. The tip 116 extends between the first sidewall 108 and the second sidewall 112 and between the leading edge 104 and the trailing edge 106. The tip base 118 defines a tip plane 120. In the illustrated embodiment of FIG. 3, the tip 116 is embodied as a suction side-squealer tip that extends fully along the first sidewall 108, i.e., the pressure surface 110 and partially along the second sidewall 112, i.e., the suction surface 114. Alternatively, the tip 116 may include any other type of tip generally known in the art, without any limitations.

Further, the aerofoil 102 defines a chordal length L1 between the leading edge 104 and the trailing edge 106 at the tip 116. In some embodiments, the tip 116 includes a first tip wall portion 122 and a second tip wall portion 124 disposed proximate to the first and second sidewalls 108, 112, respectively, and extending at least partially between the leading and trailing edges 104, 106. In some embodiments, the first and second tip wall portions 122, 124 at least partially correspond to geometries of the first and second sidewalls 108, 112, respectively. The first and second tip wall portions 122, 124 extend radially outward from the tip base 118.

The turbine blade 100 further includes at least one first recessed portion 130 proximal to the tip 116 and recessed inboard from the pressure surface 110. Further, the at least one first recessed portion 130 is disposed proximal to and spaced apart from the trailing edge 106 of the aerofoil 102. In some embodiments, the at least one first recessed portion 130 extends from or is spaced apart from the tip 116. In the illustrated embodiment of FIG. 3, the first recessed portion 130 extends from the tip 116.

Further, the at least one first recessed portion 130 includes a base surface 140 disposed inboard from the pressure surface 110. The at least one first recessed portion 130 also includes a first surface 142 extending from the base surface 140 to the pressure surface 110. The first surface 142 further extends at least radially towards the tip 116. The first surface 142 defines a radially inner edge 146 and a radially outer edge 148. In some embodiments, a length L2 of the first surface 142 between the radially inner edge 146 and the radially outer edge 148 is from about 1.5% to about 30% of the chordal length L1. In some embodiments, a minimum distance D1 between the radially inner edge 146 of the first surface 142 and the trailing edge 106 of the aerofoil 102 is at most 90% of the chordal length L1.

Further, the first surface 142 is inclined obliquely to the tip plane 120 by a first angle α (shown in FIG. 4A). In some embodiments, the first angle α is greater than about 45 degrees and less than about 90 degrees. In an embodiment, the first angle α may lie between about 60 degrees and about 90 degrees.

In some embodiments, the first surface 142 further includes a first longitudinal edge 150 extending from the radially inner edge 146 to the radially outer edge 148 and connected to the pressure surface 110. In some embodiments, the first surface 142 further includes a second longitudinal edge 152 disposed opposite the first longitudinal edge 150 and extending from the radially inner edge 146 to the radially outer edge 148. Further, the second longitudinal edge 152 is connected to the base surface 140. In some embodiments, a width W1 (shown in FIG. 4C) of the first surface 142 is defined between the first longitudinal edge 150 and the second longitudinal edge 152. In some examples, the width W1 of the first surface 142 may correspond to a depth of the first recessed portion 130 along the direction Z. Further, the width W1 may be decided based on a thickness t1 (see FIG. 2) of the first sidewall 108. In some embodiments, the width W1 of the first surface 142 between the first longitudinal edge 150 and the second longitudinal edge 152 is from about 20% to about 80% of the thickness t1 of the first sidewall 108.

The at least one first recessed portion 130 further includes a second surface 144 extending from the base surface 140 to the pressure surface 110. The second surface 144 further extends from the first surface 142 distal to the tip 116 towards the trailing edge 106. In some embodiments, the second surface 144 is connected to the radially inner edge 146. Specifically, the first surface 142 extends from the radially inner edge 146 connected to the second surface 144 to the radially outer edge 148 proximal to the tip 116. Moreover, the second surface 144 is inclined relative to the first surface 142. In some embodiments, the second surface 144 is further inclined to the tip plane 120 by a second angle γ (shown in FIG. 7A) from about 0 degree to about 40 degrees. In the illustrated embodiment of FIG. 3, the second surface 144 is substantially parallel to the tip plane 120. The second angle γ is not illustrated in FIG. 3 as the second angle γ is substantially equal to 0 degrees. Further, the second surface 144 may be substantially planar.

In some embodiments, the at least one first recessed portion 130 further includes a third surface 154 extending from the base surface 140 to the pressure surface 110 opposite to the first surface 142. In some embodiments, the third surface 154 extends between an inboard edge 156 connected to the base surface 140 and an outboard edge 158 connected to the pressure surface 110. The third surface is embodied as an inclined surface herein. In some embodiments, a minimum distance D2 between the radially inner edge 146 of the first surface 142 and the outboard edge 158 of the third surface 154 is from about 3% to about 40% of the chordal length L1 of the aerofoil 102. In some examples, higher values of the minimum distance D2 may allow ease in manufacturing and may also generate a larger flow of the cooling fluid near the tip 116. In some embodiments, each of the first surface 142, the third surface 154, and the base surface 140 extends from the tip 116, such that the base surface 140 separates the first surface 142 and the third surface 154 at the tip 116.

The turbine blade 100 further includes at least one slot 160 extending from the first surface 142 of the at least one first recessed portion 130 to the internal cooling circuit 126 (see FIG. 2) such that the at least one slot 160 fluidly communicates the at least one first recessed portion 130 with the internal cooling circuit 126. Moreover, the at least one slot 160 is configured to allow a flow of the cooling fluid from the internal cooling circuit 126 to the at least one first recessed portion 130. A flow direction F1 of the cooling fluid is illustrated in FIG. 3. In the illustrated embodiment of FIG. 3, the slot 160 includes a capsule shape. Alternatively, the slot 160 may include any suitable shape, e.g., an oval shape, a rectangular shape, a square shape, a circular shape, an irregular shape, and the like. Further, in the illustrated embodiment of FIG. 3, only one slot 160 extends from the first surface 142. Alternatively, multiple slots similar to the slot 160 may extend from the first surface 142. The slot 160 defines a slot axis S1.

In the illustrated embodiment of FIG. 3, the at least one slot 160 is disposed proximal to the radially inner edge 146 of the first surface 142. Such a slot 160 disposed proximate to the radially inner edge 146 of the first surface 142 may allow efficient filling of the first recessed portion 130 with the cooling fluid and may also allow improved flow of the cooling fluid towards relatively hotter portions of the turbine blade 100, such as, the tip 116 of the turbine blade 100.

Referring to FIG. 4A, the at least one slot 160 is inclined to the tip plane 120 by a first slot angle β1 from about 0 degree to about 45 degrees. As illustrated in FIG. 4A, the first slot angle β1 is defined between the slot axis S1 and the tip plane 120. In some embodiments, the first slot angle β1 lies between about 10 degrees and about 20 degrees.

Referring to FIG. 4B, in some embodiments, the at least one slot 160 is inclined to a transverse plane 121 of the aerofoil 102 by a second slot angle β2 from about 0 degree to about 25 degrees. In some embodiments, the transverse plane 121 is normal to the tip plane 120 and extends from the leading edge 104 (see FIG. 3) to the trailing edge 106. As illustrated in FIG. 4B, the second slot angle β2 is defined between the slot axis S1 and the transverse plane 121. In some embodiments, the second slot angle β2 is less than about 10 degrees. In some examples, the first slot angle β1 (see FIG. 4A) and the second slot angle β2 may be defined such that the slot 160 may be easy to define from a manufacturing standpoint. Moreover, the first slot angle β1 (see FIG. 4A) and the second slot angle β2 may be defined such that the cooling fluid exiting the slot 160 may be directed towards the tip 116 and the trailing edge 106.

Referring to FIG. 4C, in some embodiments, the at least one slot 160 includes a slot opening 161 disposed on the first surface 142 and fluidly communicating with the at least one first recessed portion 130 (see FIG. 3). In some embodiments, a minimum distance D3 between the slot opening 161 and the radially inner edge 146 is at most 10% of the length L2 of the first surface 142 between the radially inner edge 146 and the radially outer edge 148. In some embodiments, a minimum distance D4 between the slot opening 161 and the first longitudinal edge 150 is greater than a minimum distance D5 between the slot opening 161 and the second longitudinal edge 152. In some embodiments, the width W1 of the first surface 142 between the first longitudinal edge 150 and the second longitudinal edge 152 is greater than the minimum distance D4 between the slot opening 161 and the first longitudinal edge 150 by a factor of at least three.

In some embodiments, a maximum length L3 of the slot opening 161 between the radially inner edge 146 and the radially outer edge 148 of the first surface 142 is from about 0.4% to about 15% of the chordal length L1 (see FIG. 3). In some embodiments, the maximum length L3 of the slot opening 161 is greater than a maximum width W2 of the slot opening 161 perpendicular to the maximum length L3 by a factor of at least two. In some embodiments, the maximum width W2 of the slot opening 161 is from about 0.4% to about 3% of the chordal length L1.

Figure 5:
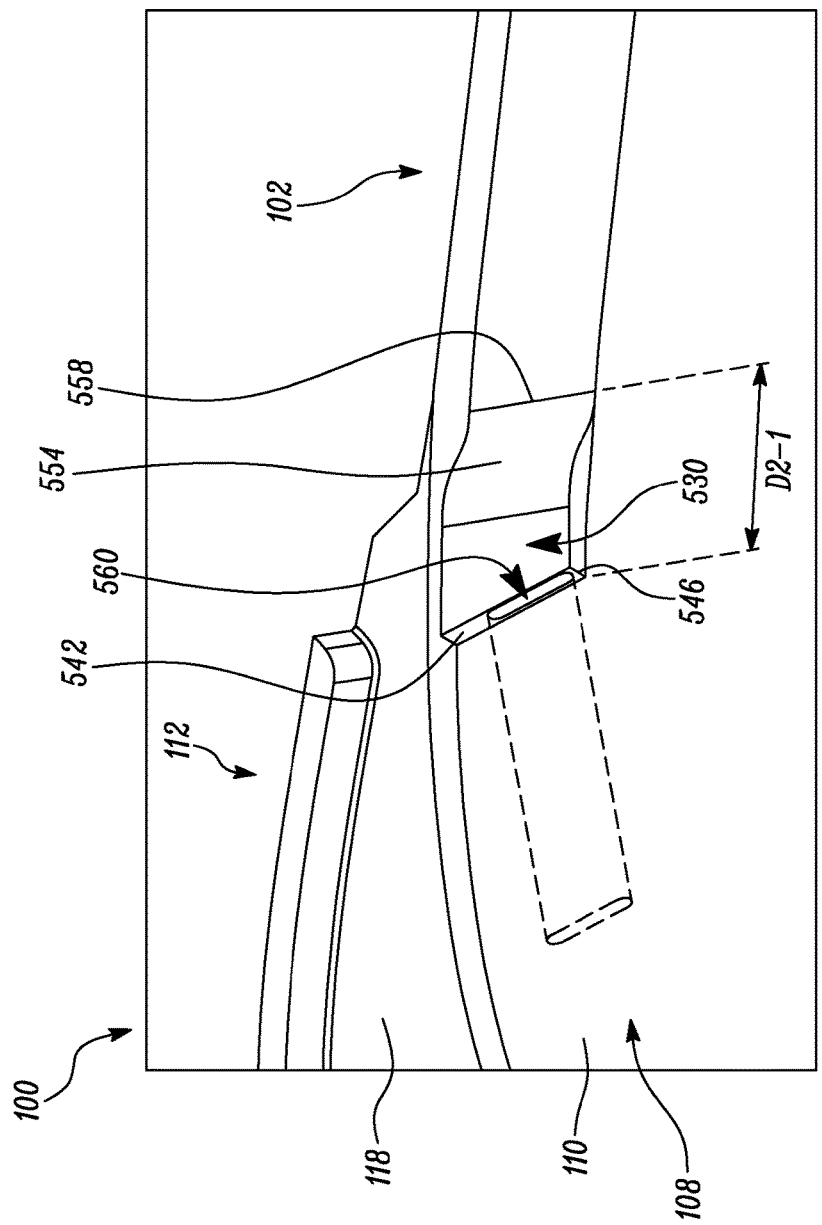
FIG. 5 is a schematic perspective view of a first recessed portion associated with the turbine blade of FIG. 3.

FIG. 5 shows a schematic perspective view of a portion of the turbine blade 100, according to an embodiment of the present disclosure. The turbine blade 100 includes a first recessed portion 530. The first recessed portion 530 may be substantially similar to the first recessed portion 130 shown in FIG. 3. The first recessed portion 530 defines a first surface 542 having a radially inner edge 546. The first recessed portion 530 also defines a third surface 554 having an outboard edge 558. In the illustrated embodiment of FIG. 5, a minimum distance D2-1 defined between the radially inner edge 546 of the first surface 542 and the outboard edge 558 of the third surface 554 is lesser than the distance D2 (see FIG. 3) defined between the radially inner edge 146 (see FIG. 3) of the first surface 142 (see FIG. 3) and the outboard edge 158 (see FIG. 3) of the third surface 154 (see FIG. 3). Further, the turbine blade 100 defines a slot 560. The slot 560 is disposed proximate to the radially inner edge 546. The slot 560 may be substantially similar to the slot 160 (see FIG. 3). In the illustrated embodiment of FIG. 5, only one slot 560 extends from the first surface 542. Alternatively, multiple slots similar to the slot 560 may extend from the first surface 542.

Figure 6A:
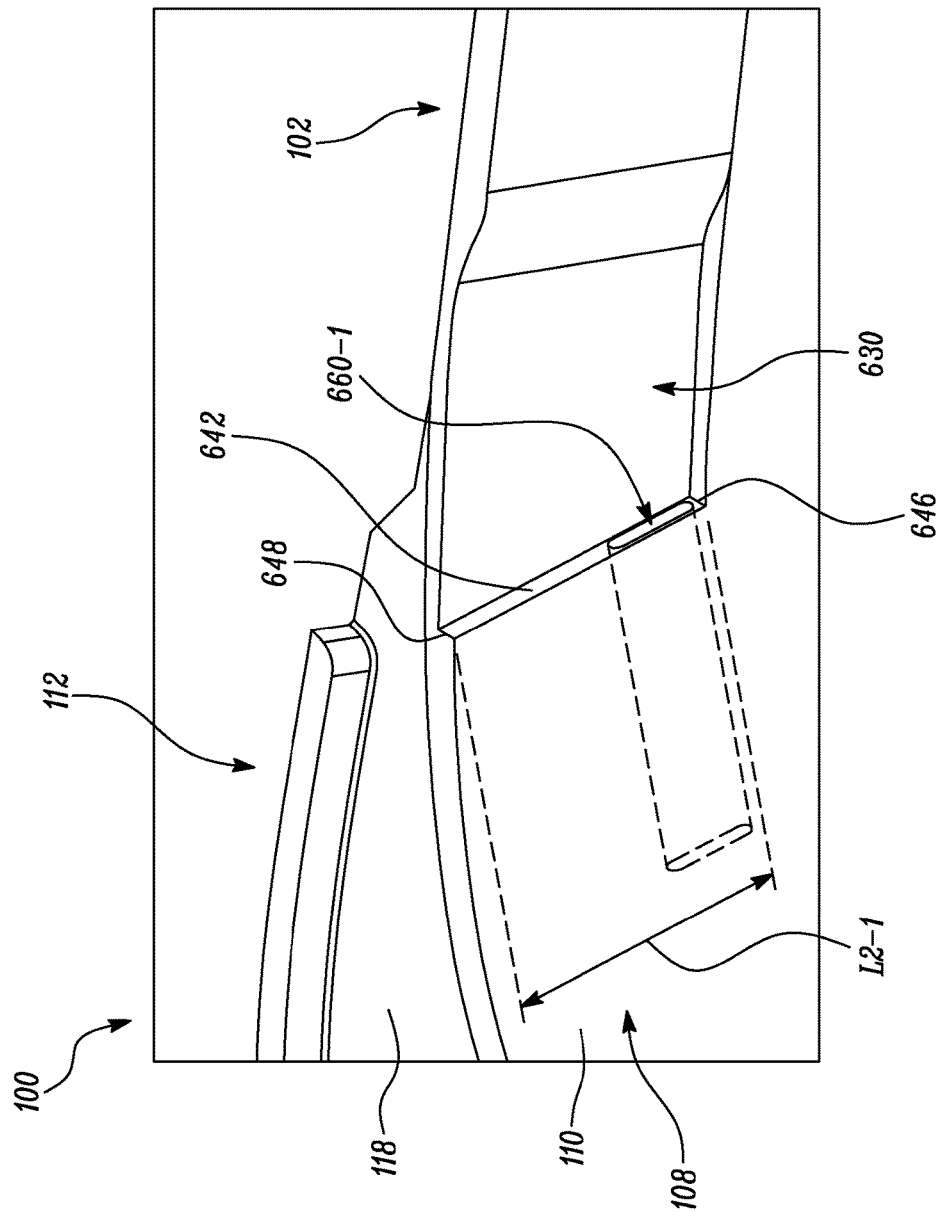
FIG. 6A is a schematic perspective view illustrating a first recessed portion associated with the turbine blade of FIG. 3.

FIG. 6A shows a schematic perspective view of a portion of the turbine blade 100, according to another embodiment of the present disclosure. The turbine blade 100 includes a first recessed portion 630. The first recessed portion 630 defines a first surface 642. The first surface 642 defines a radially inner edge 646 and a radially outer edge 648 such that a length L2-1 of the first surface 642 is defined between the radially inner and outer edges 646, 648. The length L2-1 of the first surface 642 is greater than the length L2 (see FIG. 3) of the first surface 142 (see FIG. 3) of the first recessed portion 130 (see FIG. 3). In some examples, the length L2-1 may be greater than the length L2 by a factor of at least two, without any limitations. Further, the turbine blade 100 defines a slot 660-1. The slot 660-1 is disposed proximate to the radially inner edge 646. The slot 660-1 may be substantially similar to the slot 160 (see FIG. 3). The first surface 642 having the increased length L2 between the radially inner and outer edges 646, 648 may increase a cooling fluid carrying capacity of the first recessed portion 630, which may in turn improve the cooling of the turbine blade 100 having only one first recessed portion 630.

Figure 6B:
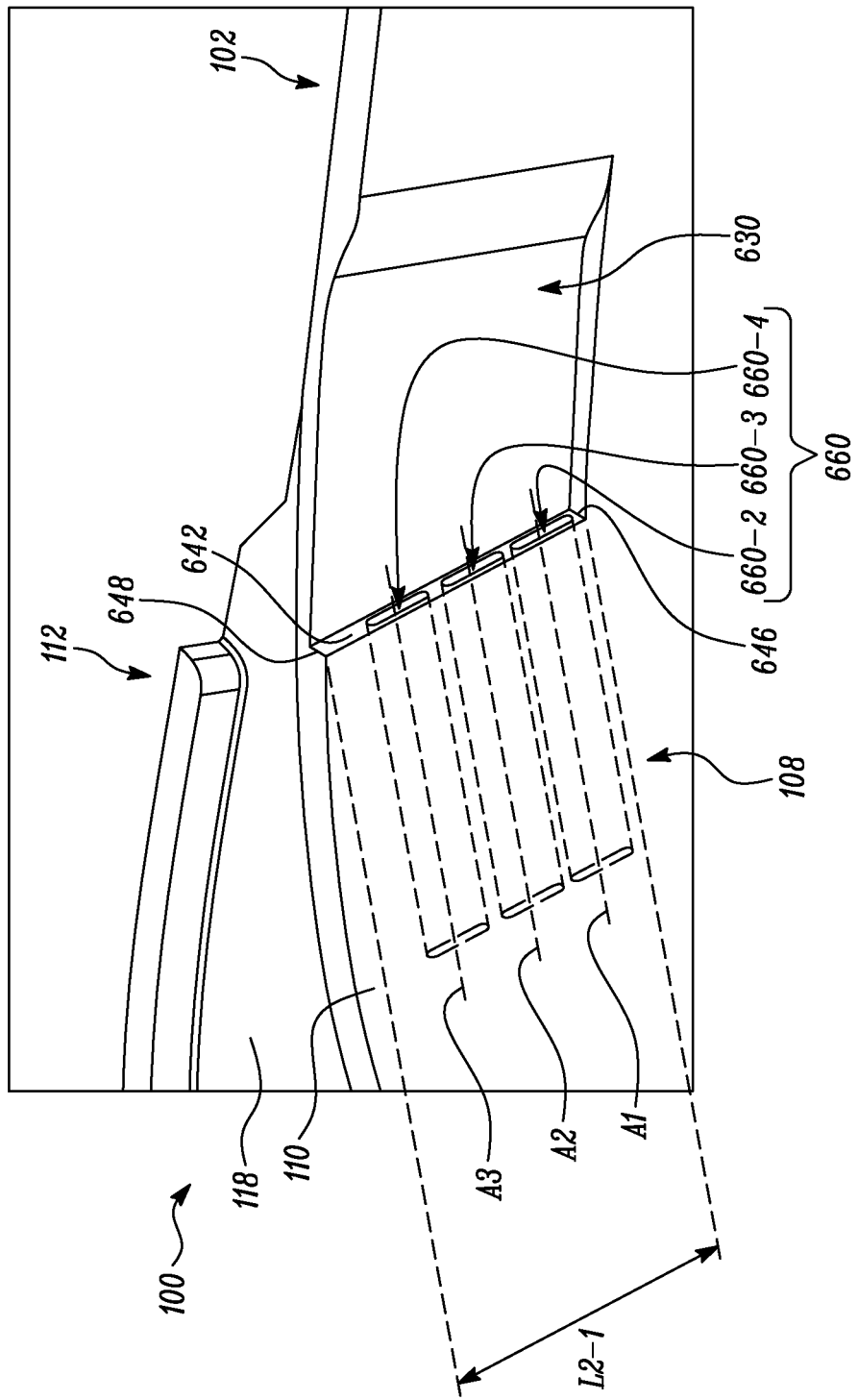
FIG. 6B is a schematic perspective view illustrating a first recessed portion associated with the turbine blade of FIG. 3.

FIG. 6B shows a schematic perspective view of a portion of the turbine blade 100 including the first recessed portion 630. In the illustrated embodiment of FIG. 6B, the at least one slot 660 includes a plurality of slots 660-2, 660-3, 660-4 extending from the first surface 642. Further, the plurality of slots 660-2, 660-3, 660-4 includes rows of slots 660-2, 660-3, 660-4 that are parallel to each other. The slots 660-2, 660-3, 660-4 may be substantially similar to the slot 160 (see FIG. 3). The plurality of slots 660-2, 660-3, 660-4 may provide a larger coverage of the cooling fluid on the surfaces of the turbine blade 100 and may improve the cooling of the turbine blade 100 as compared to only one slot 160. Further, a slot axis A1 is defined by the slot 660-2, a slot axis A2 is defined by the slot 660-3, and a slot axis A3 is defined by the slot 660-4. Further, each of the slot axes A1, A2, A3 are parallel to each other.

FIG. 7A shows a schematic perspective view of a portion of the turbine blade 100, according to an embodiment of the present disclosure. In the illustrated embodiment of FIG. 7A, the turbine blade 100 includes a first recessed portion 730 proximal to the tip 116 and recessed inboard from the pressure surface 110. Further, the first recessed portion 730 is disposed proximal to and spaced apart from the trailing edge 106 of the aerofoil 102. The first recessed portion 730 includes a base surface 740 substantially similar to the base surface 140 (see FIG. 3). The first recessed portion 730 also includes a first surface 742 substantially similar to the first surface 142 (see FIG. 3).

The first recessed portion 730 further includes a second surface 744 extending from the base surface 740 to the pressure surface 110. The second surface 744 further extends from the first surface 742 distal to the tip 116 towards the trailing edge 106. Moreover, the second surface 744 is inclined relative to the first surface 742. As illustrated in FIG. 7A, the second surface 744 is inclined such that the second surface 744 extends between a radially inner edge 746 of the first surface 742 and a third surface 754 of the first recessed portion 730. In some embodiments, the second surface 744 is inclined to the tip plane 120 by the second angle γ from about 0 degree to about 40 degrees. In the illustrated embodiment of FIG. 7A, the second angle γ may lie between about 20 degrees and about 40 degrees. An inclination of the second surface 744 may direct the cooling fluid towards the tip 116 of the turbine blade 100, thereby improving cooling at the tip 116. Further, the second surface 744 may be substantially planar. In some embodiments, the first recessed portion 730 further includes the third surface 754 substantially similar to the third surface 154 (see FIG. 3). In some examples, the first recessed portion 730 may omit the third surface 754 such that the second surface 744 extends from the first surface 742 to the tip 116.

The turbine blade 100 further defines a slot 760-1. The slot 760-1 may be substantially similar to the slot 160 (see FIG. 3). Further, the slot 760-1 includes a capsule shape herein. Alternatively, the slot 760-1 may include any suitable shape, e.g., an oval shape, a rectangular shape, a square shape, a circular shape, an irregular shape, and the like. Further, in the illustrated embodiment of FIG. 7A, only one slot 760-1 extends from the first surface 742. Alternatively, multiple slots similar to the slot 760-1 may extend from the first surface 742.

Figures 7C, 7D:
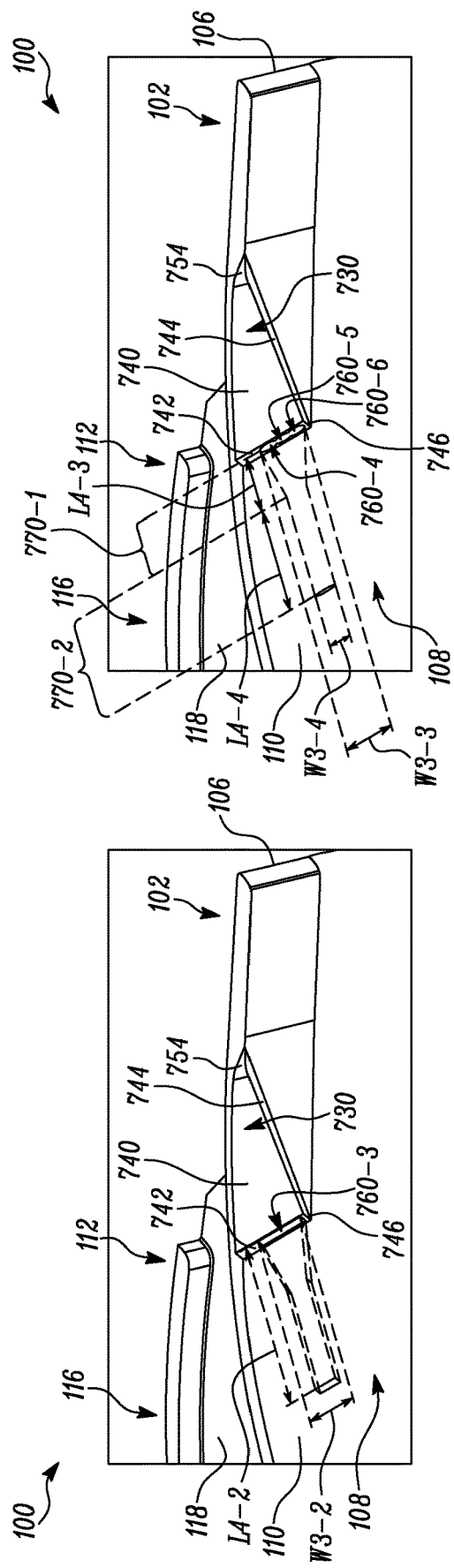
FIG. 7C is a schematic perspective view of a first recessed portion associated with the turbine blade of FIG. 3.
FIG. 7D is a schematic perspective view of a first recessed portion associated with the turbine blade of FIG. 3.

FIGS. 7B and 7C are schematic perspective views of the turbine blade 100, according to different embodiments of the present disclosure. Referring to FIG. 7B, at least one slot 760-2 extends from the first surface 742. Further, the at least one slot 760-2 tapers along at least a portion of its length L4-1 from the first surface 742. Specifically, a maximum width W3-1 of the slot 760-2 is defined proximate to the first surface 742 and the maximum width W3-1 decreases along the length L4-1. In other examples, the maximum width W3-1 of the slot 760-2 may increase from the first surface 742-2 along the length L4-1. In the illustrated embodiment of FIG. 7B, a portion of the slot 760-2 that is proximate to the first surface 742 includes a tapering cross-section whereas a portion of the slot 760-2 that is distal from the first surface 742 includes a uniform cross-section. Alternatively, the maximum width W3-1 of the slot 760-2 may gradually decrease from the first surface 742 towards the internal cooling circuit 126 (see FIG. 2).

Further, the slot 760-2 includes an oval shape herein. Alternatively, the slot 760-2 may include any suitable shape, e.g., a capsule shape, a rectangular shape, a square shape, a circular shape, an irregular shape, and the like. Further, in the illustrated embodiment of FIG. 7B, only one slot 760-2 extends from the first surface 742. Alternatively, multiple slots similar to the slot 760-2 may extend from the first surface 742.

Referring to FIG. 7C, at least one slot 760-3 extends from the first surface 742. The at least one slot 760-3 tapers along at least a portion of its length L4-2 from the first surface 742. Specifically, a maximum width W3-2 of the slot 760-3 is defined proximate to the first surface 742 and the maximum width W3-2 decreases from the first surface 742-3 along the length L4-2. In other examples, the maximum width W3-2 of the slot 760-3 may increase from the first surface 742-3 along the length L4-2. In the illustrated embodiment of FIG. 7C, a portion of the slot 760-3 that is proximate to the first surface 742 includes a tapering cross-section whereas a portion of the slot 760-3 that is distal from the first surface 742 includes a uniform cross-section. Alternatively, the maximum width W3-2 of the slot 760-3 may gradually decrease from the first surface 742 towards the internal cooling circuit 126 (see FIG. 2).

Further, the slot 760-3 includes a rectangular shape herein. Alternatively, the slot 760-3 may include any suitable shape, e.g., a capsule shape, an oval shape, a square shape, a circular shape, an irregular shape, and the like. Further, in the illustrated embodiment of FIG. 7C, only one slot 760-3 extends from the first surface 742. Alternatively, multiple slots similar to the slot 760-3 may extend from the first surface 742.

Referring now to FIG. 7D, a plurality of slots 760-4, 760-5, 760-6 extends from the first surface 742. The slots 760-4, 760-5, 760-6 include intersecting slot openings herein. The slots 760-4, 760-5, 760-6 together define a first slot section 770-1 extending from the first surface 742. Further, a maximum width W3-3 of the first slot section 770-1 is defined proximate to the first surface 742 and the maximum width W3-3 decreases along a length L4-3 of the first slot section 770-1. In other examples, the maximum width W3-3 of the first slot section 770-1 may increase from the first surface 742 along the length L4-3. Further, the slots 760-4, 760-5, 760-6 together define a second slot section 770-2 that is in fluid communication with the first slot section 770-1. Furthermore, a maximum width W3-4 of the second slot section 770-2 is defined proximate to the first slot section 770-1 and the maximum width W3-4 is uniform along a length L4-4 of the second slot section 770-2. Moreover, the slots 760-4, 760-5, 760-6 include a circular shape herein. Alternatively, the slots 760-4, 760-5, 760-6 may include any suitable shape, e.g., a capsule shape, an oval shape, a square shape, a rectangular shape, an irregular shape, and the like.

Figure 8:
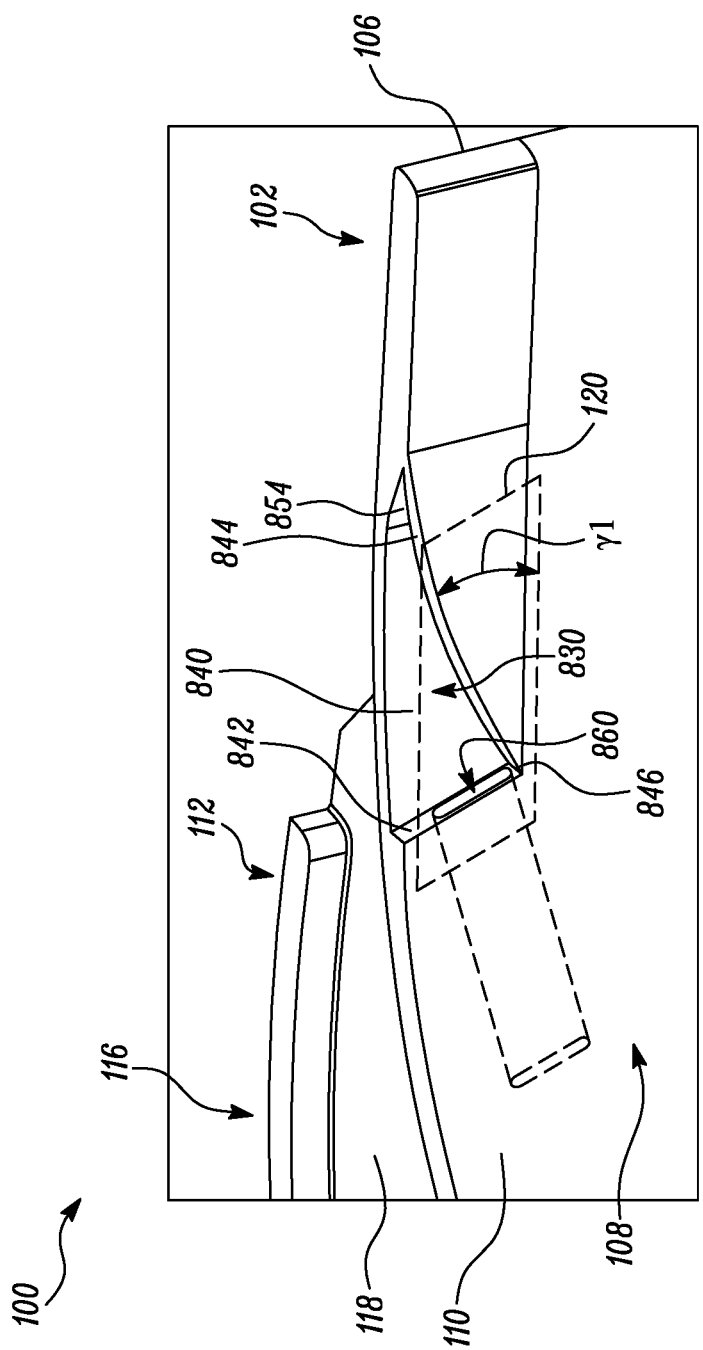
FIG. 8 is a schematic perspective view of a first recessed portion associated with the turbine blade of FIG. 3.

FIG. 8 shows a schematic perspective view of a portion of the turbine blade 100, according to an embodiment of the present disclosure. In the illustrated embodiment of FIG. 8, the turbine blade 100 includes a first recessed portion 830 proximal to the tip 116 and recessed inboard from the pressure surface 110. Further, the first recessed portion 830 is disposed proximal to and spaced apart from the trailing edge 106 of the aerofoil 102. The first recessed portion 830 includes a base surface 840 substantially similar to the base surface 140 (see FIG. 3). The first recessed portion 830 also includes a first surface 842 substantially similar to the first surface 142 (see FIG. 3).

The first recessed portion 830 further includes a second surface 844 extending from the base surface 840 to the pressure surface 110. The second surface 844 further extends from the first surface 842 distal to the tip 116 towards the trailing edge 106. Moreover, the second surface 844 is inclined relative to the first surface 842. An inclination of the second surface 844 may direct the cooling fluid towards the tip 116 of the turbine blade 100, thereby improving cooling of the tip 116. In some embodiments, the second surface 844 is inclined to the tip plane 120 by a second angle γ1 from about 0 degree to about 40 degrees. In the illustrated embodiment of FIG. 8, the second angle γ1 may lie between about 20 degrees and about 40 degrees. As illustrated in FIG.

8, the second surface 844 is inclined such that the second surface 844 extends between a radially inner edge 846 of the first surface 842 and a third surface 854 of the first recessed portion 830. The third surface 854 may be substantially similar to the third surface 154 (see FIG. 3). In some examples, the first recessed portion 830 may omit the third surface 854 such that the second surface 844 extends from the first surface 842 to the tip 116.

Further, as illustrated in FIG. 8, the second surface 844 is substantially curved. More particularly, the second surface 844 has a convex shape herein. In another example, the second surface 844 may have a concave shape. The turbine blade 100 further includes a slot 860 that directs the cooling fluid towards the first recessed portion 830. The slot 860 may be substantially similar to the slot 160 (see FIG. 3). Further, the slot 860 includes a capsule shape herein. Alternatively, the slot 860 may include any suitable shape. e.g., an oval shape, a rectangular shape, a square shape, a circular shape, an irregular shape, and the like. In the illustrated embodiment of FIG. 8, only one slot 860 extends from the first surface 842. Alternatively, multiple slots similar to the slot 860 may extend from the first surface 842.

Figure 9B:
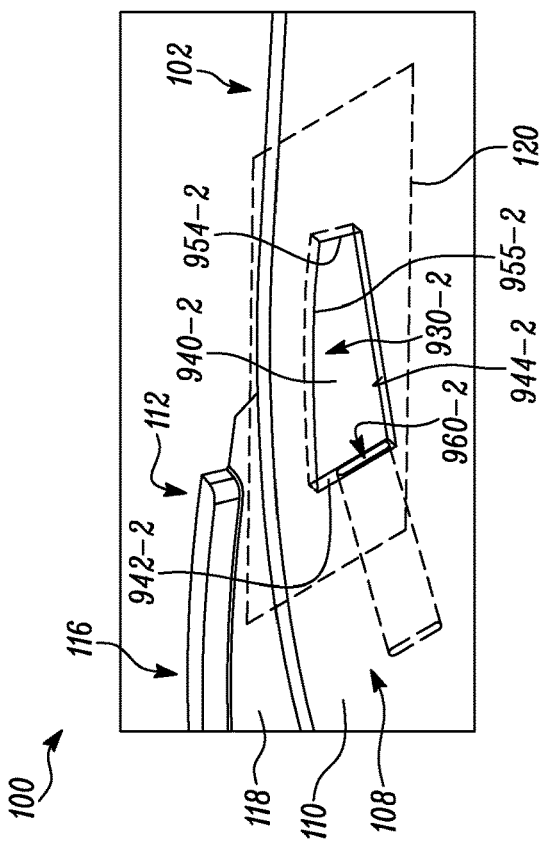
FIG. 9B is a schematic perspective view of recessed portions associated with the turbine blade of FIG. 3 that are spaced apart from a tip of the turbine blade.
Figure 9A:
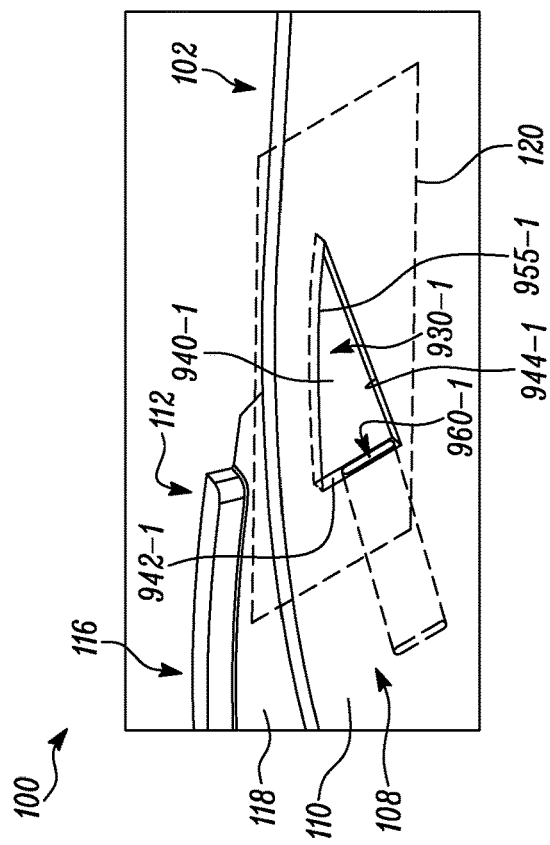
FIG. 9A is a schematic perspective view of recessed portions associated with the turbine blade of FIG. 3 that are spaced apart from a tip of the turbine blade.

FIG. 9A shows a schematic perspective view of a portion of the turbine blade 100, according to another embodiment of the present disclosure. In the illustrated embodiment of FIG. 9A, the turbine blade 100 includes a first recessed portion 930-1 proximal to the tip 116 and recessed inboard from the pressure surface 110. Further, the first recessed portion 930-1 is disposed proximal to and spaced apart from the trailing edge 106 of the aerofoil 102. In the illustrated embodiment of FIG. 9A, the first recessed portion 930-1 is spaced apart from the tip 116. The first recessed portion 930-1 includes a base surface 940-1 disposed inboard from the pressure surface 110. The first recessed portion 930-1 also includes a first surface 942-1 extending from the base surface 940-1 to the pressure surface 110. The first surface 942-1 further extends at least radially towards the tip 116 and is spaced apart from the tip 116.

The first recessed portion 930-1 further includes a second surface 944-1 extending from the base surface 940-1 to the pressure surface 110. The second surface 944-1 further extends from the first surface 942-1 distal to the tip 116 towards the trailing edge 106. Moreover, the second surface 944-1 is inclined relative to the first surface 942-1.

In some embodiments, the first recessed portion 930-1 further includes a fourth surface 955-1 extending from the base surface 940-1 to the pressure surface 110 and connected to the first surface 942-1. The fourth surface 955-1 axially extends between the first surface 942-1 and the second surface 944-1. In some embodiments, the fourth surface 955-1 is disposed opposite to the second surface 944-1. The fourth surface 955-1 may be substantially parallel to the tip plane 120. In the illustrated embodiment of FIG. 9A, the second surface 944-1 extends between and is connected to the first surface 942-1 and the fourth surface 955-1. Moreover, the second surface 944-1 may be inclined relative to the fourth surface 955-1. The turbine blade 100 further includes a slot 960-1 substantially similar to the slot 160 (see FIG. 3). Further, the slot 960-1 includes a rectangular shape herein. Alternatively, the slot 960-1 may include any suitable shape, e.g., a capsule shape, an oval shape, a square shape, a circular shape, an irregular shape, and the like. In the illustrated embodiment of FIG. 9A, only one slot 960-1 extends from the first surface 942. Alternatively, multiple slots similar to the slot 960-1 may extend from the first surface 942.

FIG. 9B shows a schematic perspective view of a portion of the turbine blade 100, according to yet another embodiment of the present disclosure. In the illustrated embodiment of FIG. 9B, the turbine blade 100 includes a first recessed portion 930-2 proximal to the tip 116 and recessed inboard from the pressure surface 110. Further, the first recessed portion 930-2 is spaced apart from the tip 116. Further, the first recessed portion 930-2 is disposed proximal to and spaced apart from the trailing edge 106 of the aerofoil 102. The first recessed portion 930-2 includes a base surface 940-2 disposed inboard from the pressure surface 110. The first recessed portion 930-2 further includes a first surface 942-2 extending from the base surface 940-2 to the pressure surface 110. The first surface 942-2 further extends at least radially towards the tip 116 and is spaced apart from the tip 116.

The first recessed portion 930-2 further includes a second surface 944-2 extending from the base surface 940-2 to the pressure surface 110. The second surface 944-2 further extends from the first surface 942-2 distal to the tip 116 towards the trailing edge 106. Moreover, the second surface 944-2 is inclined relative to the first surface 942-2. In the illustrated embodiment of FIG. 9B, the second surface 944-2 is spaced apart from the tip 116. As illustrated in FIG. 9B, the second surface 944-2 extends between the first surface 942-2 and a third surface 954-2. Further, the third surface 954-2 extends from the base surface 940-2 to the pressure surface 110 opposite to the first surface 942-2.

In some embodiments, the first recessed portion 930-2 further includes a fourth surface 955-2 extending from the base surface 940-2 to the pressure surface 110 and connected to the first surface 942-2. The fourth surface 955-2 axially extends between and is connected to the first surface 942-2 and the third surface 954-2. In some embodiments, the fourth surface 955-2 is disposed opposite to the second surface 944-2. The fourth surface 955-2 may be substantially parallel to the tip plane 120. In some embodiments, the second surface 944-2 is inclined relative to the fourth surface 955-2. The turbine blade 100 further includes a slot 960-2 substantially similar to the slot 160 (see FIG. 3). Further, the slot 960-2 includes a rectangular shape herein. Alternatively, the slot 960-2 may include any suitable shape, e.g., a capsule shape, an oval shape, a square shape, a circular shape, an irregular shape, and the like. In the illustrated embodiment of FIG. 9B, only one slot 960-2 extends from the first surface 942. Alternatively, multiple slots similar to the slot 960-2 may extend from the first surface 942.

Figure 10:
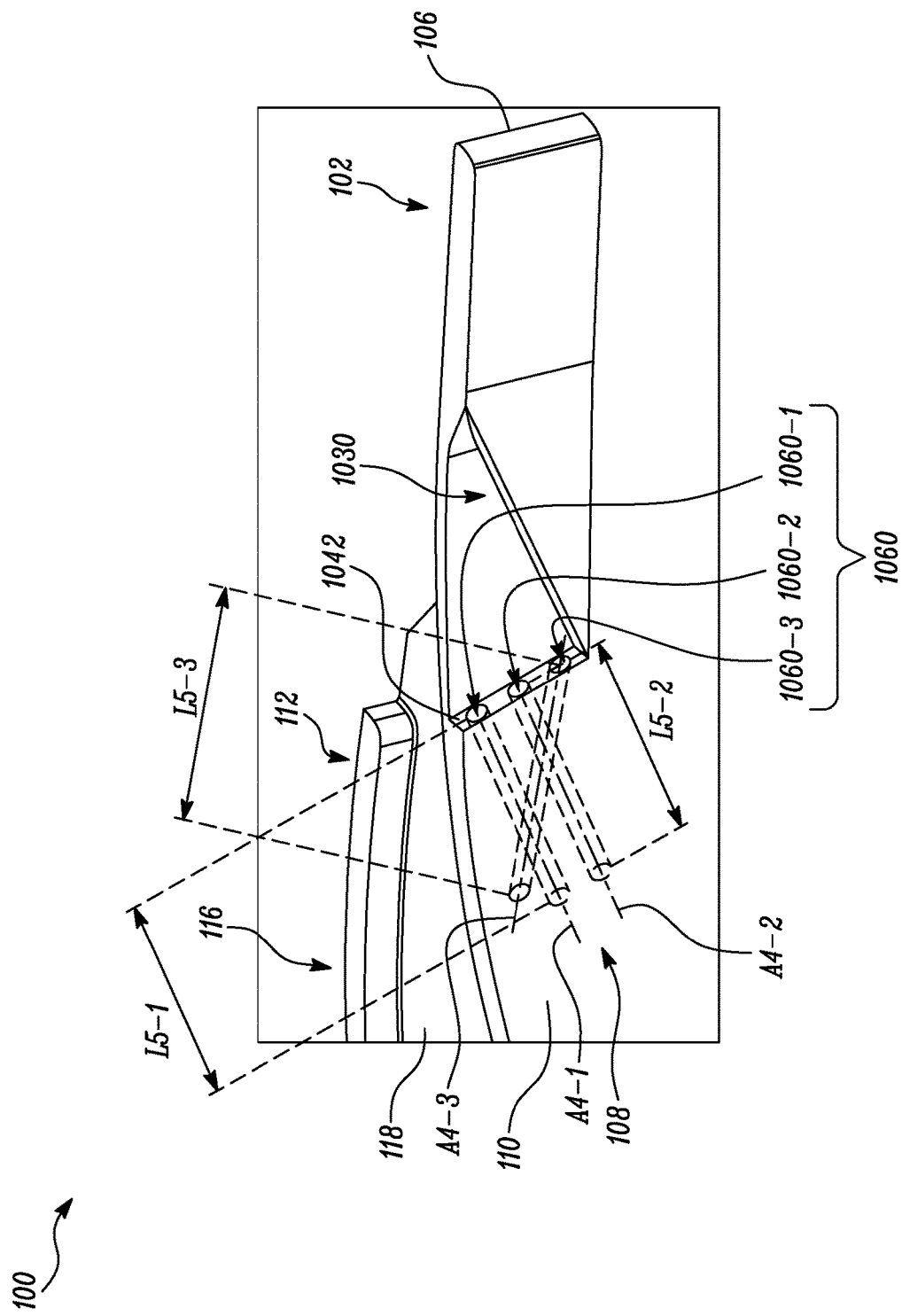
FIG. 10 is a schematic perspective view of a first recessed portion associated with the turbine blade of FIG. 3 illustrating a plurality of slots that intersect each other.

FIG. 10 shows a schematic perspective view of a portion of the turbine blade 100, according to an embodiment of the present disclosure. As illustrated in FIG. 10, the turbine blade 100 includes a first recessed portion 1030 substantially similar to the first recessed portion 730 shown and described in relation to FIG. 7A. The first recessed portion 1030 includes a first surface 1042 that is substantially similar to the first surface 742 shown in FIG. 7A.

The turbine blade 100 further includes at least one slot 1060 extending from the first surface 1042. In the illustrated embodiment of FIG. 10, the at least one slot 1060 includes a plurality of slots 1060-1, 1060-2, 1060-3 extending from the first surface 1042. Specifically, the at least one slot 1060 includes at least one first slot 1060-1, 1060-2 and at least one second slot 1060-3.

In the illustrated embodiment of FIG. 10, the at least one first slot 1060-1, 1060-2 from the plurality of slots 1060-1, 1060-2, 1060-3 defines a first slot axis A4-1, A4-2 along its length L5-1, L5-2 and the at least one second slot 1060-3 from the plurality of slots 1060-1, 1060-2, 1060-3 defines a second slot axis A4-3 along its length L5-3. Further, the first slot axis A4-1, A4-2 intersects with the second slot axis A4-3. Moreover, in the illustrated embodiment of FIG. 10, the slots 1060-1, 1060-2, 1060-3 include a circular shape. Alternatively, the slots 1060-1, 1060-2, 1060-3 may include any suitable shape, e.g., an oval shape, a capsule shape, a rectangular shape, a square shape, an irregular shape, and the like.

Figure 11:
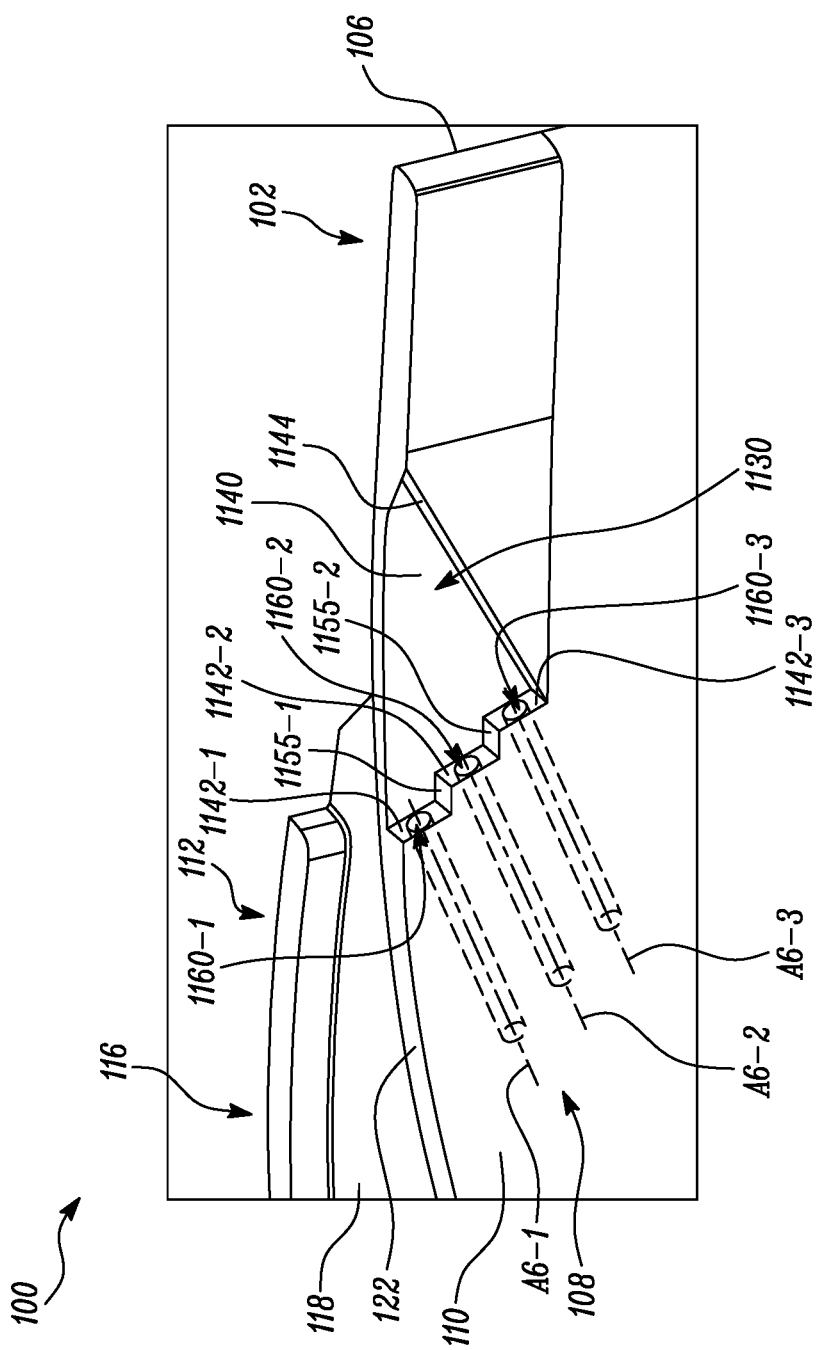
FIG. 11 is a schematic perspective view of a first recessed portion associated with the turbine blade of FIG. 3 having a plurality of first surfaces.

FIG. 11 is a schematic perspective view of a portion of the turbine blade 100, according to another embodiment of the present disclosure. In the illustrated embodiment of FIG. 11, the turbine blade 100 includes a first recessed portion 1130 proximal to the tip 116 and recessed inboard from the pressure surface 110. Further, the first recessed portion 1130 is disposed proximal to and spaced apart from the trailing edge 106 of the aerofoil 102. The first recessed portion 1130 includes a base surface 1140 disposed inboard from the pressure surface 110. The first recessed portion 1130 further includes a plurality of first surfaces 1142-1, 1142-2, 1142-3 inclined obliquely to the tip plane 120 (see FIG. 3) and spaced apart from each other, such that one of the plurality of first surfaces 1142-3 is connected to a second surface 1144. Further, the first surfaces 1142-1, 1142-2, 1142-3 are substantially orthogonal to the tip plane 120. As illustrated herein, the first surfaces 1142-1, 1142-2, 1142-3 are substantially orthogonal to the first tip wall portion 122. Further, the second surface 1144 may extend between the first surface 1142-3 and the tip 116. Moreover, the second surface 1144 may be inclined relative to the first surfaces 1142-1, 1142-2, 1142-3. The second surface 1144 may be inclined obliquely relative to the first surfaces 1142-1, 1142-2, 1142-3.

In some embodiments, the first recessed portion 1130 further includes one or more connecting surface portions 1155-1, 1155-2 extending between corresponding adjacent first surfaces 1142-1, 1142-2, 1142-3 from the plurality of first surfaces 1142-1, 1142-2, 1142-3. Specifically, the connecting surface portion 1155-1 extends between the first surface 1142-1 and the first surface 1142-2. Further, the connecting surface portion 1155-2 extends between the first surface 1142-2 and the first surface 1142-3. In some embodiments, each of the one or more connecting surface portions 1155-1, 1155-2 is inclined to each of the corresponding adjacent first surfaces 1142-1, 1142-2, 1142-3. For example, the connecting surface portion 1155-1 may be inclined to the first surfaces 1142-1, 1142-2, 1142-3 and the connecting surface portion 1155-2 may be inclined to the first surfaces 1142-1, 1142-2, 1142-3. In some examples, the connecting surface portion 1155-1 may be orthogonal to the first surfaces 1142-1, 1142-2, 1142-3 and the connecting surface portion 1155-2 may be orthogonal to the first surfaces 1142-1, 1142-2, 1142-3.

Further, the turbine blade 100 includes a plurality of slots 1160-1, 1160-2, 1160-2. Moreover, at least one slot 1160-1, 1160-2, 1160-3 from the plurality of slots 1160-1, 1160-2, 1160-3 extends from each of the plurality of first surfaces 1142-1, 1142-2, 1142-3. In the illustrated embodiment of FIG. 11, only one slot 1160-1, 1160-2, 1160-3 extends from the corresponding first surfaces 1142-1, 1142-2, 1142-3. In other examples, multiple slots similar to the slots 1160-1, 1160-2, 1160-3 may extend from the corresponding first surfaces 1142-1, 1142-2, 1142-3. As illustrated herein, the slot 1160-1 defining a slot axis A6-1 extends from the first surface 1142-1, the slot 1160-2 defining a slot axis A6-2 extends from the first surface 1142-2, and the slot 1160-3 defining a slot axis A6-3 extends from the first surface 1142-3. Further, each of the slot axes A6-1, A6-2, A6-3 are parallel to each other. In other examples, at least one of the slot axis A6-1, A6-2, A6-3 may intersect at least one of the other slot axis A6-1, A6-2, A6-3. Furthermore, the slots 1160-1, 1160-2, 1160-3 include a circular shape herein. Alternatively, the slots 1160-1, 1160-2, 1160-3 may include any suitable shape, e.g., a capsule shape, a rectangular shape, a square shape, an oval shape, an irregular shape, and the like. Such a staggered arrangement of the first surfaces 1142-1, 1142-2, 1142-3 may allow provision of increased number of slots 1160-1, 1160-2, 1160-3 for the turbine blade 100 that includes only one first recessed portion 1130, which may in turn improve the cooling of the turbine blade 100.

Figure 12:
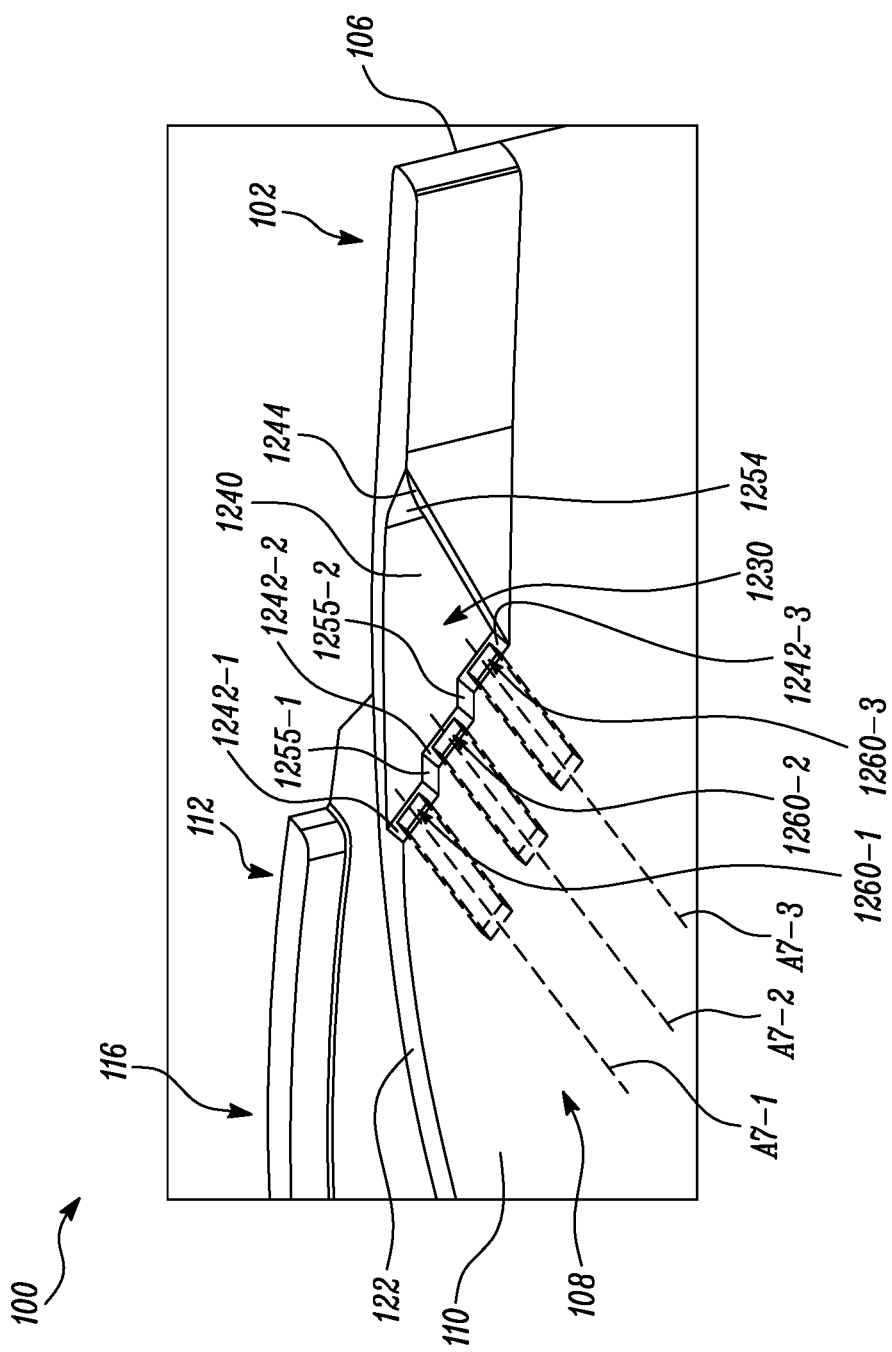
FIG. 12 is a schematic perspective view of a first recessed portion associated with the turbine blade of FIG. 3 having a plurality of first surfaces.

FIG. 12 shows a schematic perspective view of a portion of the turbine blade 100, according to another embodiment of the present disclosure. In the illustrated embodiment of FIG. 12, the turbine blade 100 includes a first recessed portion 1230 proximal to the tip 116 and recessed inboard from the pressure surface 110. Further, the first recessed portion 1230 is disposed proximal to and spaced apart from the trailing edge 106 of the aerofoil 102. The first recessed portion 1230 includes a base surface 1240 disposed inboard from the pressure surface 110. The first recessed portion 1230 further includes a plurality of first surfaces 1242-1, 1242-2, 1242-3 inclined obliquely to the tip plane 120 (see FIG. 3) and spaced apart from each other, such that one of the plurality of first surfaces 1242-3 is connected to a second surface 1244. As illustrated herein, the first surfaces 1242-1, 1242-2, 1242-3 are inclined obliquely to the first tip wall portion 122. Further, the second surface 1244 extends between the first surface 1242-3 and a third surface 1254. Moreover, the second surface 1244 is inclined relative to the first surfaces 1242-1, 1242-2, 1242-3. In some embodiments, the second surface 1244 is inclined obliquely relative to the first surfaces 1242-1, 1242-2, 1242-3.

In some embodiments, the first recessed portion 1230 further includes one or more connecting surface portions 1255-1, 1255-2 extending between corresponding adjacent first surfaces 1242-1, 1242-2, 1242-3 from the plurality of first surfaces 1242-1, 1242-2, 1242-3. Specifically, the connecting surface portion 1255-1 extends between the first surface 1242-1 and the first surface 1242-2. Further, the connecting surface portion 1255-2 extends between the first surface 1242-2 and the first surface 1242-3. In some embodiments, each of the one or more connecting surface portions 1255-1, 1255-2 is inclined to each of the corresponding adjacent first surfaces 1242-1, 1242-2, 1242-3. For example, the connecting surface portion 1255-1 may be inclined to the first surfaces 1242-1, 1242-2, 1242-3 and the connecting surface portion 1255-2 may be inclined to the first surfaces 1242-1, 1242-2, 1242-3. In some examples, the connecting surface portion 1255-1 may be orthogonal to the first surfaces 1242-1, 1242-2, 1242-3 and the connecting surface portion 1255-2 may be orthogonal to the first surfaces 1242-1, 1242-2, 1242-3.

Further, the turbine blade 100 includes a plurality of slots 1160-1, 1160-2, 1160-2. Moreover, at least one slot 1260-1, 1260-2, 1260-3 from the plurality of slots 1260-1, 1260-2, 1260-3 extends from each of the plurality of first surfaces 1242-1, 1242-2, 1242-3. In the illustrated embodiment of FIG. 12, only one slot 1260-1, 1260-2, 1260-3 extends from the corresponding first surfaces 1242-1, 1242-2, 1242-3. In other examples, multiple slots similar to the slots 1260-1, 1260-2, 1260-3 may extend from the corresponding first surfaces 1242-1, 1242-2, 1242-3. Further, the slot 1260-1 defining a slot axis A7-1 extends from the first surface 1242-1, the slot 1260-2 defining a slot axis A7-2 extends from the first surface 1242-2, and the slot 1260-3 defining a slot axis A7-3 extends from the first surface 1242-3. Further, each of the slot axes A7-1, A7-2, A7-3 are parallel to each other. In other examples, at least one of the slot axis A7-1, A7-2, A7-3 may intersect at least one of the other slot axis A7-1, A7-2, A7-3. Moreover, the slots 1260-1, 1260-2, 1260-3 include a rectangular shape herein. Alternatively, the slots 1260-1, 1260-2, 1260-3 may include any suitable shape, e.g., a capsule shape, a circular shape, a square shape, an oval shape, an irregular shape, and the like. Such a staggered arrangement of the first surfaces 1242-1, 1242-2, 1242-3 may allow provision of increased number of slots 1260-1, 1260-2, 1260-3 for the turbine blade 100 that includes only one first recessed portion 1230, which may in turn improve the cooling of the turbine blade 100.

Figure 13:
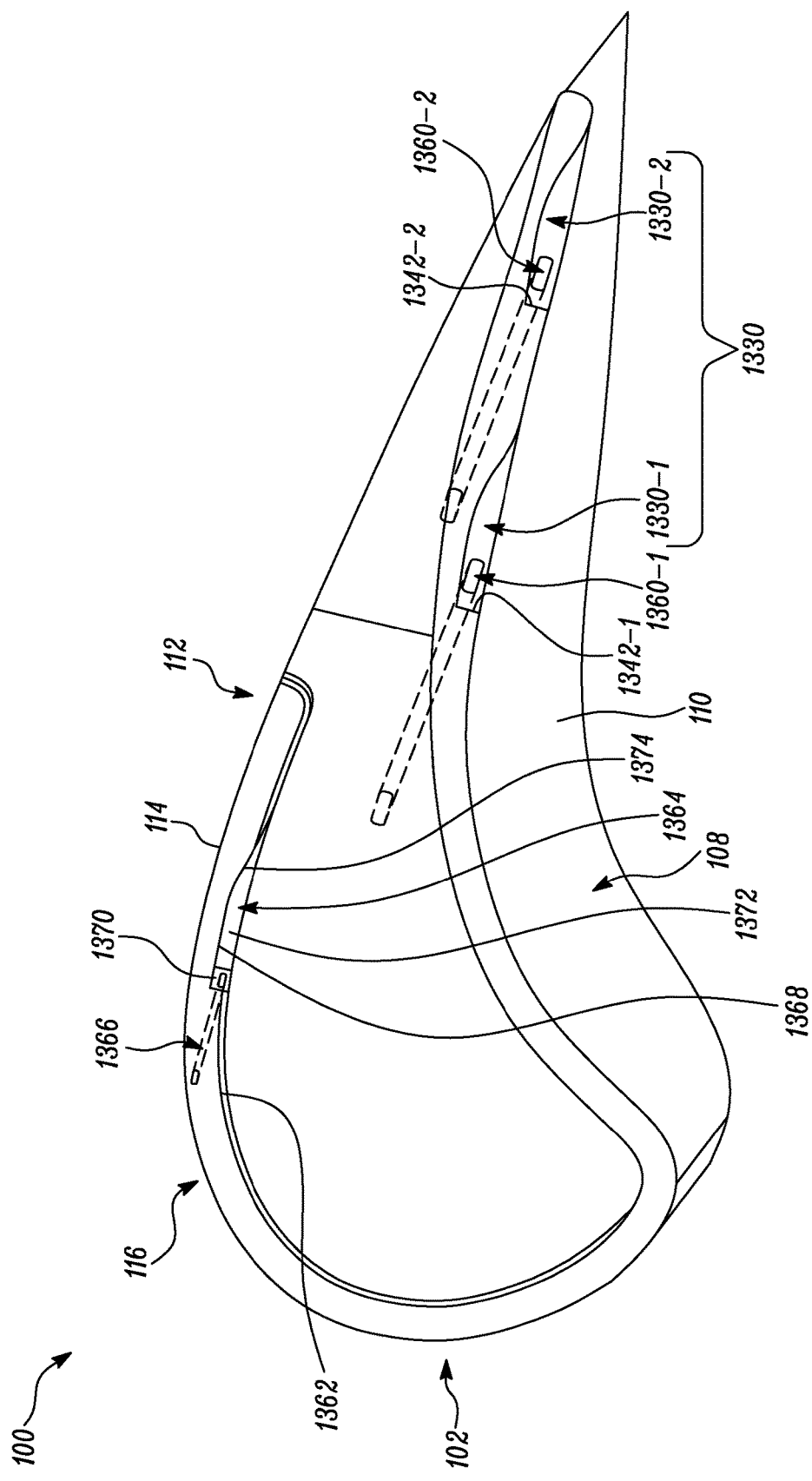
FIG. 13 is a schematic perspective view of a first recessed portion associated with the turbine blade of FIG. 3 having a plurality of first recessed portions and a second recessed portion.

FIG. 13 illustrates a top view of the turbine blade 100, according to an embodiment of the present disclosure. The turbine blade 100 includes at least one first recessed portion 1330. In some embodiments, the at least one first recessed portion 1330 includes a plurality of first recessed portions 1330-1, 1330-2 spaced apart from each other and disposed along the first sidewall 108. Each of the first recessed portions 1330-1, 1330-2 may be substantially similar to the first recessed portion 130 shown in FIG. 3. Provision of the two first recessed portions 1330-1, 1330-2 may improve the cooling of the tip 116 and/or the trailing edge 106.

Further, the turbine blade 1000 includes a pair of slots 1360-1, 1360-2 in fluid communication with the corresponding first recessed portions 1330-1, 1330-2. Specifically, the slot 1360-1 extends from a first surface 1342-1 defined by the first recessed portion 1330-1 and the slot 1360-2 extends from a first surface 1342-2 defined by the first recessed portion 1330-2. The slots 1360-1, 1360-2 may allow improved coverage of the cooling fluid on the turbine blade 100, thereby improving cooling of the turbine blade 100. In the illustrated embodiment of FIG. 13, each first surface 1342-1, 1342-2 defines only one corresponding slot 1360-1, 1360-2. In other embodiments, multiple slots similar to the slots 1360-1, 1360-2 may extend from the corresponding first surfaces 1342-1, 1342-2, without any limitations. Further, the slots 1360-1, 1360-2 include a capsule shape herein. Alternatively, the slots 1360-1, 1360-2 may include any suitable shape, e.g., an oval shape, a rectangular shape, a square shape, a circular shape, an irregular shape, and the like.

In the illustrated embodiment of FIG. 13, the second sidewall 112 defines an inner surface 1362 opposite to the suction surface 114. Further, the turbine blade 1300 includes at least one second recessed portion 1364 and at least one slot 1366 extending from the at least one second recessed portion 1364 to the internal cooling circuit 126 (see FIG. 2), such that the at least one slot 1366 fluidly communicates the at least one second recessed portion 1364 with the internal cooling circuit 126. The at least one second recessed portion 1364 is disposed on the inner surface 1362 of the second sidewall 112. The cooling fluid exiting the slot 1366 may improve a cooling of the inner surface 1362 of the second sidewall 112. The second recessed portion 1364 may be substantially similar to the first recessed portion 130 shown in FIG. 3. The second recessed portion 1364 includes a base surface 1368, a first surface 1370, a second surface 1372, and a third surface 1374 substantially similar to the base surface 140 (see FIG. 3), the first surface 142 (see FIG. 3), the second surface 144 (see FIG. 3), and the third surface 154 (see FIG. 3) of the first recessed portion 130. Further, the slot 1366 includes a capsule shape herein. Alternatively, the slot 1366 may include any suitable shape an oval shape, a rectangular shape, a square shape, a circular shape, an irregular shape, and the like. Further, in the illustrated embodiment of FIG. 13, only one slot 1366 extends from the first surface 1340. Alternatively, multiple slots similar to the slot 1366 may extend from the first surface 1340.

Figure 14:
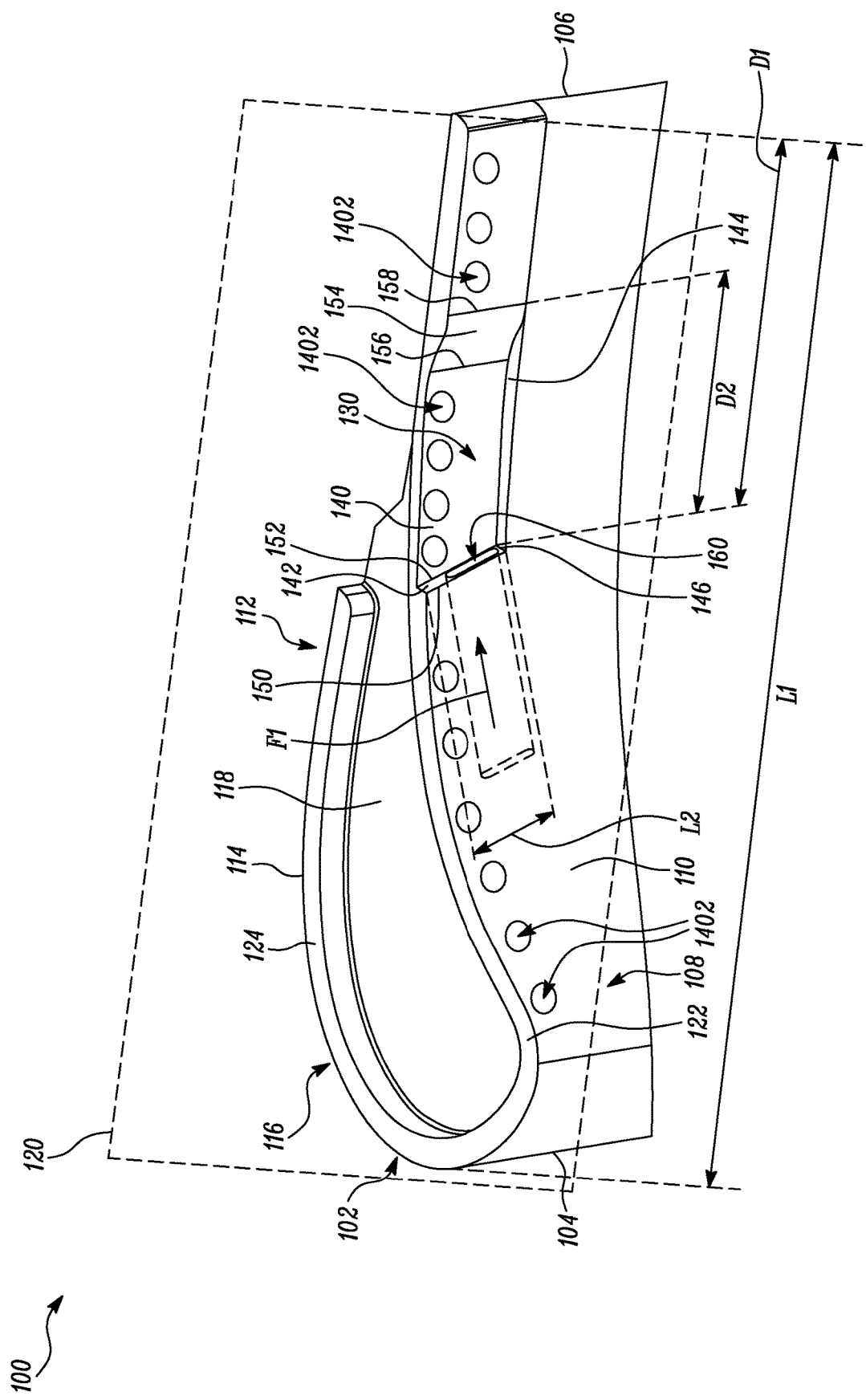
FIG. 14 is a schematic perspective view of the turbine blade of FIG. 3 having the first recessed portion and a number of cooling holes defined proximal to the tip.

FIG. 14 shows a schematic perspective view of the turbine blade 100, according to different embodiments of the present disclosure. In the illustrated embodiment of FIG. 14, in addition to the first recessed portion 130, the turbine blade 100 also includes a plurality of cooling holes 1402 disposed proximal to the tip 116 and along the first sidewall 108. The plurality of cooling holes 1402 may be in fluid communication with the internal cooling circuit 126 (see FIG. 2) and may receive the cooling fluid from the internal cooling circuit 126. Thus, the plurality of cooling holes 1402 may allow a flow of the cooling fluid from the internal cooling circuit 126 towards the tip 116 and the trailing edge 106. The cooling holes 1402 include a circular shape herein. Alternatively, the cooling holes 1402 may include any other shape, without any limitations.

FIGS. 15A and 15B illustrate different types of turbine blades 1500, 1502 that may include the at least one first recessed portion 130 (see FIG. 3), according to different embodiments of the present disclosure. Referring to FIG. 15A, the turbine blade 1500 may have a flat tip 1516-1. Referring to FIG. 15B, the turbine blade 1502 may have a squealer tip 1516-2 extending across an entire perimeter of the turbine blade 1502.

Referring to FIGS. 3 to 14, different designs of the first recessed portion 130, 530, 630, 730, 830, 930-1, 930-2, 1030, 1130, 1230, 1330-1, 1330-2 that may be defined on the turbine blade 100 may allow efficient cooling of various portions of the turbine blade 100, such as, the trailing edge 106 and/or the tip 116. In some examples, the first recessed portion 130, 530, 630, 730, 830, 930-1, 930-2, 1030, 1130, 1230, 1330-1, 1330-2 may allow improved coverage of the cooling fluid on various surfaces of the turbine blade 100 which may promote cooling of the turbine blade 100. Moreover, the design of the first recessed portion 130, 530, 630, 730, 830, 930-1, 930-2, 1030, 1130, 1230, 1330-1, 1330-2 may not have any undesirable impact on an aerodynamic performance of the turbine blade 100. In some examples, the first recessed portion 130, 530, 630, 730, 830, 930-1, 930-2, 1030, 1130, 1230, 1330-1, 1330-2 described herein may also minimize an amount of cooling fluid that may be required for cooling the turbine blade 100.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A turbine blade for a gas turbine engine, the turbine blade comprising:
    an aerofoil comprising a leading edge, a trailing edge, a first sidewall defining a pressure surface, and a second sidewall defining a suction surface, wherein the first sidewall and the second sidewall are connected to each other at each of the trailing edge and the leading edge;
    an internal cooling circuit disposed within the aerofoil and configured to direct a cooling fluid within the aerofoil;
    a tip comprising a tip base disposed on the aerofoil, the tip base extending between the first sidewall and the second sidewall and between the leading edge and the trailing edge, the tip base defining a tip plane, wherein the aerofoil defines a chordal length between the leading edge and the trailing edge at the tip;

at least one first recessed portion formed on the first sidewall proximal to the tip and recessed inboard from the pressure surface, wherein the at least one first recessed portion is disposed proximal to and spaced apart from the trailing edge of the aerofoil, and wherein the at least one first recessed portion comprises:

a base surface disposed inboard from the pressure surface;

a first surface extending from the base surface to the pressure surface, the first surface further extending at least radially towards the tip, wherein the first surface is inclined obliquely to the tip plane by a first angle; and a second surface extending from the base surface to the pressure surface, the second surface further extending from the first surface distal to the tip towards the trailing edge, wherein the second surface is inclined relative to the first surface; and at least one slot extending from the first surface of the at least one first recessed portion to the internal cooling circuit such that the at least one slot fluidly communicates the at least one first recessed portion with the internal cooling circuit, wherein the at least one slot is configured to allow a flow of the cooling fluid from the internal cooling circuit to the at least one first recessed portion.

2. The turbine blade of claim 1, wherein the first surface extends from a radially inner edge connected to the second surface to a radially outer edge proximal to the tip, and wherein the at least one slot is disposed proximal to the radially inner edge of the first surface.

3. The turbine blade of claim 2, wherein a minimum distance between the radially inner edge of the first surface and the trailing edge of the aerofoil is at most 90% of the chordal length.

4. The turbine blade of claim 2, wherein a length of the first surface between the radially inner edge and the radially outer edge is from 1.5% to 30% of the chordal length.

5. The turbine blade of claim 2, wherein the first surface further comprises:

a first longitudinal edge extending from the radially inner edge to the radially outer edge and connected to the pressure surface; and a second longitudinal edge disposed opposite to the first longitudinal edge and extending from the radially inner edge to the radially outer edge, the second longitudinal edge being connected to the base surface;

wherein a minimum distance between the slot opening and the first longitudinal edge is greater than a minimum distance between the slot opening and the second longitudinal edge.

6. The turbine blade of claim 5, wherein a width of the first surface between the first longitudinal edge and the second longitudinal edge is greater than the minimum distance between the slot opening and the first longitudinal edge by factor of at least three.

7. The turbine blade of claim 6, wherein the width of the first surface between the first longitudinal edge and the second longitudinal edge is from 20% to 80% of a thickness of the first sidewall.

8. The turbine blade of claim 2, wherein the at least one first recessed portion further comprises a third surface extending from the base surface to the pressure surface opposite to the first surface, the third surface extending between an inboard edge connected to the base surface and an outboard edge connected to the pressure surface, and wherein a minimum distance between the radially inner edge of the first surface and the outboard edge of the third surface is from 3% to 40% of the chordal length of the aerofoil.

9. The turbine blade of claim 8, wherein each of the first surface, the third surface, and the base surface extends from the tip, such that the base surface separates the first surface and the third surface at the tip.

10. The turbine blade of claim 1, wherein the at least one slot comprises a slot opening disposed on the first surface and fluidly communicating with the at least one first recessed portion, and wherein a minimum distance between the slot opening and the radially inner edge is at most 10% of the length of the first surface between the radially inner edge and the radially outer edge.

11. The turbine blade of claim 10, wherein a maximum length of the slot opening between the radially inner edge and the radially outer edge of the first surface is from 0.4% to 15% of the chordal length.

12. The turbine blade of claim 11, wherein the maximum length of the slot opening is greater than a maximum width of the slot opening perpendicular to the maximum length by a factor of at least two.

13. The turbine blade of claim 12, wherein the maximum width of the slot opening is from 0.4% to 3% of the chordal length.

14. The turbine blade of claim 1, wherein the at least one first recessed portion further comprises a fourth surface extending from the base surface to the pressure surface and connected to the first surface, and wherein the fourth surface is disposed opposite to the second surface.

15. The turbine blade of claim 1, wherein the first angle is greater than 45 degrees and less than 90 degrees.

16. The turbine blade of claim 1, wherein the second surface is inclined to the tip plane by a second angle from 0 degree to 40 degrees.

17. The turbine blade of claim 1, wherein the at least one slot is inclined to the tip plane by a first slot angle from 0 degree to 45 degrees, wherein the at least one slot is inclined to a transverse plane of the aerofoil by a second slot angle from 0 degree to 25 degrees, and wherein the transverse plane is normal to the tip plane and extends from the leading edge to the trailing edge.

18. The turbine blade of claim 1, wherein the at least one slot tapers along at least a portion of its length from the first surface.

19. The turbine blade of claim 1, wherein the at least one first recessed portion extends from or is spaced apart from the tip.

20. The turbine blade of claim 1, wherein the at least one slot comprises a plurality of slots extending from the first surface.

* * * * *